United States Patent
Okui et al.

(10) Patent No.: US 10,597,853 B2
(45) Date of Patent: Mar. 24, 2020

(54) MEASURING JIG AND HYDRAULIC EXCAVATOR CALIBRATION METHOD

(71) Applicant: KOMATSU LTD., Minato-ku, Tokyo (JP)

(72) Inventors: Ryosuke Okui, Tokyo (JP); Takeo Yamada, Tokyo (JP); Gousuke Nakashima, Tokyo (JP)

(73) Assignee: KOMATSU LTD., Minato-ku, Tokyo (JP)

( * ) Notice: Subject to any disclaimer, the term of this patent is extended or adjusted under 35 U.S.C. 154(b) by 0 days.

(21) Appl. No.: 15/757,678

(22) PCT Filed: Jul. 13, 2017

(86) PCT No.: PCT/JP2017/025548
§ 371 (c)(1),
(2) Date: Mar. 6, 2018

(87) PCT Pub. No.: WO2019/012650
PCT Pub. Date: Jan. 17, 2019

(65) Prior Publication Data
US 2019/0024344 A1 Jan. 24, 2019

(51) Int. Cl.
| | |
|---|---|
| *E02F 9/22* | (2006.01) |
| *E02F 9/26* | (2006.01) |
| *G01B 11/26* | (2006.01) |
| *G01B 5/00* | (2006.01) |
| *G01C 15/06* | (2006.01) |
| *G01B 11/00* | (2006.01) |
| *E02F 3/32* | (2006.01) |

(52) U.S. Cl.
CPC .............. *E02F 9/26* (2013.01); *G01B 5/0004* (2013.01); *G01B 11/002* (2013.01); *G01B 11/26* (2013.01); *G01C 15/06* (2013.01); *E02F 3/325* (2013.01)

(58) Field of Classification Search
CPC ........................................................ E02F 9/26
USPC ........................................................ 356/138
See application file for complete search history.

(56) References Cited

U.S. PATENT DOCUMENTS

| 4,615,615 A * | 10/1986 | Krolak ................... G01B 11/26 |
| | | 356/141.1 |
| 2003/0169973 A1 * | 9/2003 | Togawa ............... G02B 6/3572 |
| | | 385/57 |
| 2005/0030650 A1 * | 2/2005 | Ojima ................... G02B 6/352 |
| | | 359/838 |

(Continued)

FOREIGN PATENT DOCUMENTS

| JP | S59158073 U | 10/1984 |
| JP | 2002-181545 A | 6/2002 |

(Continued)

*Primary Examiner* — Tarifur R Chowdhury
*Assistant Examiner* — Omar H Nixon
(74) *Attorney, Agent, or Firm* — Faegre Drinker Biddle & Reath LLP

(57) ABSTRACT

A measuring jig is attached to an antenna support member of a revolving unit, and used to measure a slewing position of the revolving unit together with an external measurement apparatus. The measuring jig includes a prism mirror and an attachment member. The prism mirror reflects projection light from the external measurement apparatus. The attachment member attaches the prism mirror to the antenna support member. The attachment member is configured to be attached to the antenna support member by sandwiching an attached portion.

7 Claims, 18 Drawing Sheets

(56) References Cited

U.S. PATENT DOCUMENTS

| | | | |
|---|---|---|---|
| 2006/0191406 A1* | 8/2006 | Kucher | F15B 15/2807 92/5 R |
| 2008/0047170 A1* | 2/2008 | Nichols | E02F 3/435 37/348 |
| 2008/0065298 A1* | 3/2008 | Kawaguchi | E02F 3/384 701/50 |
| 2008/0312001 A1* | 12/2008 | Lee | E05D 5/12 464/180 |
| 2010/0261652 A1* | 10/2010 | Wang | A61L 24/108 514/19.1 |
| 2012/0065840 A1* | 3/2012 | Reeb | B66C 23/905 701/36 |
| 2013/0158789 A1 | 6/2013 | Seki | |
| 2013/0166143 A1 | 6/2013 | Seki | |
| 2014/0325856 A1* | 11/2014 | Rothbucher | G01C 15/06 33/293 |
| 2015/0086167 A1* | 3/2015 | Takakura | G02B 6/3624 385/100 |
| 2015/0256048 A1* | 9/2015 | Ohta | E05F 3/02 310/80 |
| 2015/0308826 A1 | 10/2015 | Seki | |
| 2016/0076228 A1* | 3/2016 | Nau | E02F 9/261 701/50 |
| 2016/0131162 A1* | 5/2016 | Paakkunainen | A01G 23/003 56/10.2 R |
| 2018/0148904 A1* | 5/2018 | Howell | E02F 3/32 |

FOREIGN PATENT DOCUMENTS

| | | |
|---|---|---|
| JP | 2012-202062 A | 10/2012 |
| KR | 10-2013-0069743 A | 6/2013 |
| KR | 10-2015-0079956 A | 7/2015 |
| WO | WO-2012/128192 A1 | 9/2012 |
| WO | WO-2015/040726 A1 | 3/2015 |

\* cited by examiner

FIG.8

|  | No. | ITEM | SYMBOL |
|---|---|---|---|
| WORK IMPLEMENT PARAMETER | 1 | LENGTH BETWEEN BOOM PIN AND DIPPER STICK PIN | L1 |
|  | 2 | LENGTH BETWEEN DIPPER STICK PIN AND BUCKET PIN | L2 |
|  | 3 | LENGTH BETWEEN BUCKET PIN AND CUTTING EDGE OF BUCKET | L3 |
|  | 4 | DISTANCE BETWEEN BOOM CYLINDER TOP PIN AND BOOM PIN | Lboom1 |
|  | 5 | DISTANCE BETWEEN BOOM CYLINDER TOP PIN AND BOOM PIN IN xboom AXIS DIRECTION | Lboom1_x |
|  | 6 | DISTANCE BETWEEN BOOM CYLINDER TOP PIN AND BOOM PIN IN zboom AXIS DIRECTION | Lboom1_z |
|  | 7 | DISTANCE BETWEEN BOOM CYLINDER FOOT PIN AND BOOM PIN | Lboom2 |
|  | 8 | DISTANCE BETWEEN BOOM CYLINDER FOOT PIN AND BOOM PIN IN HORIZONTAL DIRECTION OF BODY | Lboom2_x |
|  | 9 | DISTANCE BETWEEN BOOM CYLINDER FOOT PIN AND BOOM PIN IN PERPENDICULAR DIRECTION OF BODY | Lboom2_z |
|  | 10 | DISTANCE BETWEEN DIPPER STICK CYLINDER FOOT PIN AND DIPPER STICK PIN | Lboom3 |
|  | 11 | DISTANCE BETWEEN DIPPER STICK CYLINDER FOOT PIN AND DIPPER STICK PIN IN xboom AXIS DIRECTION | Lboom3_x |
|  | 12 | DISTANCE BETWEEN DIPPER STICK CYLINDER FOOT PIN AND DIPPER STICK PIN IN zboom AXIS DIRECTION | Lboom3_z |
|  | 13 | DISTANCE BETWEEN DIPPER STICK PIN AND BUCKET PIN IN xarm2 AXIS DIRECTION | Larm1_x |
|  | 14 | DISTANCE BETWEEN DIPPER STICK PIN AND BUCKET PIN IN zarm2 AXIS DIRECTION | Larm1_z |
|  | 15 | DISTANCE BETWEEN DIPPER STICK CYLINDER TOP PIN AND DIPPER STICK PIN | Larm2 |
|  | 16 | DISTANCE BETWEEN DIPPER STICK CYLINDER TOP PIN AND DIPPER STICK PIN IN xarm2 AXIS DIRECTION | Larm2_x |
|  | 17 | DISTANCE BETWEEN DIPPER STICK CYLINDER TOP PIN AND DIPPER STICK PIN IN zarm2 AXIS DIRECTION | Larm2_z |
|  | 18 | DISTANCE BETWEEN BUCKET CYLINDER FOOT PIN AND FIRST LINK PIN | Larm3 |
|  | 19 | DISTANCE BETWEEN BUCKET CYLINDER FOOT PIN AND FIRST LINK PIN IN xarm2 AXIS DIRECTION | Larm3_x1 |
|  | 20 | DISTANCE BETWEEN BUCKET CYLINDER FOOT PIN AND FIRST LINK PIN IN zarm2 AXIS DIRECTION | Larm3_z1 |
|  | 21 | DISTANCE BETWEEN FIRST LINK PIN AND BUCKET PIN IN xarm2 AXIS DIRECTION | Larm3_x2 |
|  | 22 | DISTANCE BETWEEN FIRST LINK PIN AND BUCKET PIN IN zarm2 AXIS DIRECTION | Larm3_z2 |
|  | 23 | DISTANCE BETWEEN FIRST LINK PIN AND BUCKET PIN | Larm4 |
|  | 24 | DISTANCE BETWEEN BUCKET CYLINDER TOP PIN AND FIRST LINK PIN | Lbucket1 |
|  | 25 | DISTANCE BETWEEN BUCKET CYLINDER TOP PIN AND SECOND LINK PIN | Lbucket2 |
|  | 26 | DISTANCE BETWEEN BUCKET PIN AND SECOND LINK PIN | Lbucket3 |
|  | 27 | BOOM CYLINDER OFFSET | boft |
|  | 28 | DIPPER STICK CYLINDER OFFSET | aoft |
|  | 29 | BUCKET CYLINDER OFFSET | bkoft |
|  | 30 | DISTANCE BETWEEN BUCKET PIN AND SECOND LINK PIN IN xbucket AXIS DIRECTION | Lbucket4_x |
|  | 31 | DISTANCE BETWEEN BUCKET PIN AND SECOND LINK PIN IN zbucket AXIS DIRECTION | Lbucket4_z |
| ANTENNA PARAMETER | 32 | DISTANCE BETWEEN BOOM PIN AND REFERENCE ANTENNA IN x-AXIS DIRECTION OF BODY COORDINATE SYSTEM | Lbbx |
|  | 33 | DISTANCE BETWEEN BOOM PIN AND REFERENCE ANTENNA IN y-AXIS DIRECTION OF BODY COORDINATE SYSTEM | Lbby |
|  | 34 | DISTANCE BETWEEN BOOM PIN AND REFERENCE ANTENNA IN z-AXIS DIRECTION OF BODY COORDINATE SYSTEM | Lbbz |
|  | 35 | DISTANCE BETWEEN BOOM PIN AND DIRECTIONAL ANTENNA IN x-AXIS DIRECTION OF BODY COORDINATE SYSTEM | Lbdx |
|  | 36 | DISTANCE BETWEEN BOOM PIN AND DIRECTIONAL ANTENNA IN y-AXIS DIRECTION OF BODY COORDINATE SYSTEM | Lbdy |
|  | 37 | DISTANCE BETWEEN BOOM PIN AND DIRECTIONAL ANTENNA IN z-AXIS DIRECTION OF BODY COORDINATE SYSTEM | Lbdz |

| POSITION | CYLINDER STROKE (%) | | |
| --- | --- | --- | --- |
| NO. | BOOM CYLINDER | DIPPER STICK CYLINDER | BUCKET CYLINDER |
| P1 | 50 | 0 | 90 |
| P2 | 50 | 100 | 10 |
| P3 | 70 | 0 | 100 |
| P4 | 100 | 80 | 80 |
| P5 | 80 | 60 | 80 |

MEASURING JIG AND HYDRAULIC EXCAVATOR CALIBRATION METHOD

TECHNICAL FIELD

The present invention relates to a measuring jig and a hydraulic excavator calibration method.

BACKGROUND ART

In recent years, introduction of information-oriented execution is progressing into construction work in which a work machine is used. The information-oriented execution means execution in which information and communication technology (ICT) and RTK-GNSS (Real Time Kinematic-Global Navigation Satellite) are fully used when execution works such as construction works is performed using a work machine such as a hydraulic excavator. Specifically, in the information-oriented execution, a position of a work point of a work implement in the work machine is detected, and the work implement is automatically controlled based on the detected work point, thereby efficiently performing the execution work to obtain a high-accuracy execution result.

For example, in the case that the work machine is the hydraulic excavator, the work point of the work implement in the information-oriented execution is a position of a cutting edge of a bucket. The position of the cutting edge is computed as a position coordinate on design based on parameters such as a positional relationship between a GNSS antenna and a boom foot pin, lengths of a boom, a dipper stick, and the bucket, and stroke lengths of a boom cylinder, a dipper stick cylinder, and a bucket cylinder.

Dimensions of a design value are used as the lengths of the boom, the dipper stick, the bucket, and each cylinder, which are used in the above computation. However, the actual dimensions include an error due to manufacturing tolerances and assembly tolerances with respect to the design value. Consequently, the position coordinate of the cutting edge computed from the design value is not always matched with the position coordinate of the actual cutting edge, which results in a decrease in accuracy of position detection of the cutting edge. In order to improve the accuracy of the position detection of the cutting edge, it is necessary to calibrate the parameter in the design value used for the computation based on the position coordinate obtained by the actual position measurement, and it is necessary to perform calibration work such as the position measurement.

For example, International Publication No. 2015/040726 (PTD 1) discloses a technique of attaching a prism mirror that reflects projection light from a total station to the cutting edge of the bucket and of measuring the light reflected from the prism mirror to measure the position of the cutting edge.

CITATION LIST

Patent Document

PTD 1: International Publication No. 2015/040726

SUMMARY OF INVENTION

Technical Problem

Sometimes a slewing position of a revolving unit is measured in calibration work. In this case, for example, it is conceivable to mount the prism mirror with a magnet on a lower surface of the counterweight of the revolving unit.

However, for the small work machine, sometimes the prism mirror cannot be observed from the total station depending on a slewing angle. In this case, projection light cannot be projected from the total station onto the prism mirror. Consequently, accuracy of the calibration is significantly degraded, or the measurement of the slewing position cannot be performed in the calibration work.

An object of the present disclosure provides a measuring jig and a hydraulic excavator calibration method for being able to observe the prism mirror irrespective of the slewing angle position even in the small work machine.

Solution to Problem

A measuring jig according to the present disclosure is attached to an attached portion of a revolving unit, and used to measure a slewing position of the revolving unit together with an external measurement apparatus. The measuring jig includes a prism mirror and an attachment member. The prism mirror reflects projection light from the external measurement apparatus. The attachment member is attached to the attached portion of the prism mirror. The attachment member is configured to be attached to the attached portion by sandwiching the attached portion.

A hydraulic excavator calibration method according to the present disclosure is a method for calibrating a plurality of parameters in a hydraulic excavator including a revolving unit having an antenna and a support for supporting the antenna, a work implement including a boom attached to the revolving unit, a dipper stick attached to a tip of the boom, and a work tool attached to a tip of the dipper stick, and a controller for computing a current position of a work point included in the work tool based on the plurality of parameters including a slewing position of the revolving unit. The hydraulic excavator calibration method includes the following steps.

First, a measuring jig including a prism mirror and an attachment member fixed to the prism mirror is attached to a support. Projection light is projected from the external measurement apparatus to the prism mirror of the attachment member attached to the support, and reflected light reflected from the prism mirror is measured, thereby measuring the slewing position of the revolving unit. The plurality of parameters are calibrated based on the measured slewing position.

Advantageous Effects of Invention

According to the present disclosure, the measuring jig and the hydraulic excavator calibration method for being able to observe the prism mirror irrespective of the slewing angle position even in the small work machine are achieved.

BRIEF DESCRIPTION OF DRAWINGS

FIG. 8 is a view illustrating a list of parameters.

DESCRIPTION OF EMBODIMENTS

Hereinafter, with reference to the drawings, a configuration and a calibration method of a hydraulic excavator according to an embodiment of the present disclosure will be described.

(Configuration of Hydraulic Excavator)

Figure 1:
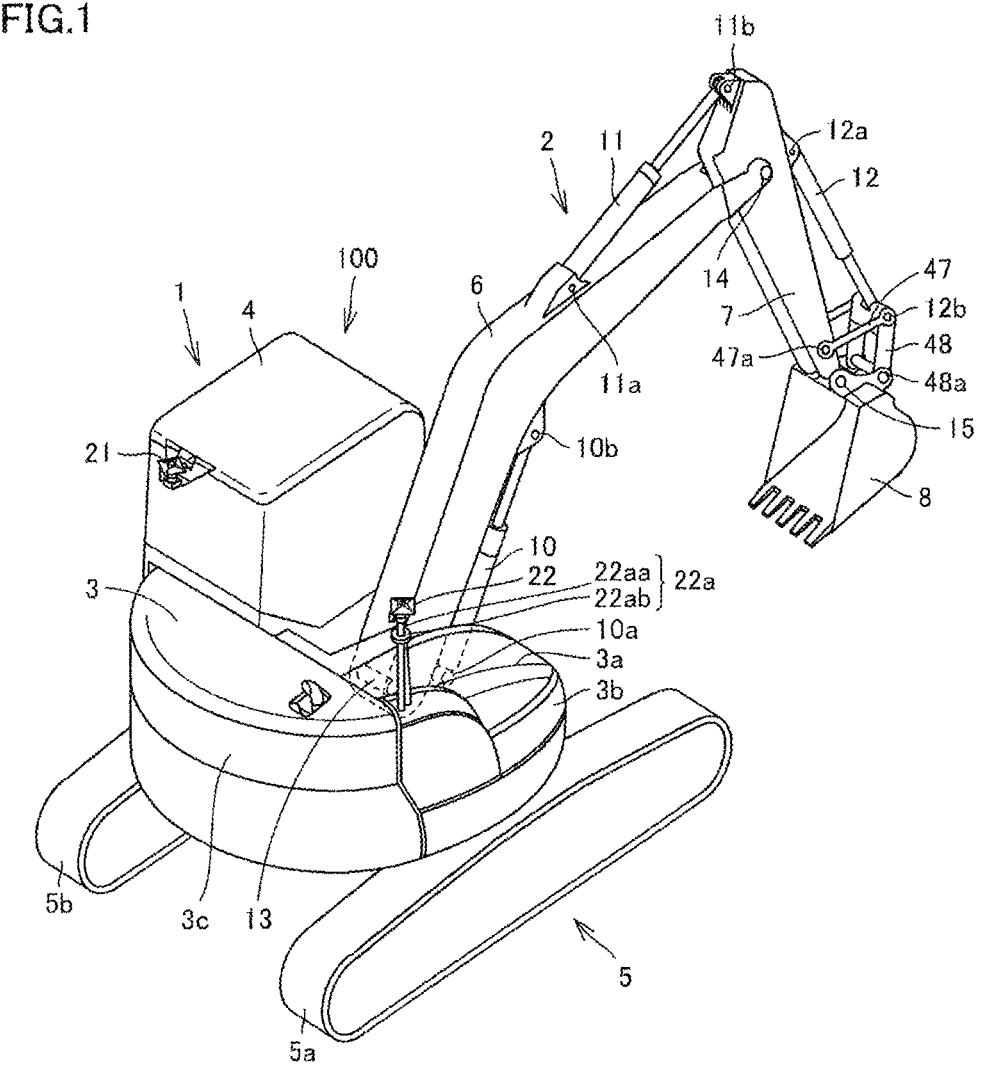
FIG. 1 is a perspective view illustrating a configuration of a hydraulic excavator according to an embodiment of the present disclosure.
Figure 4:
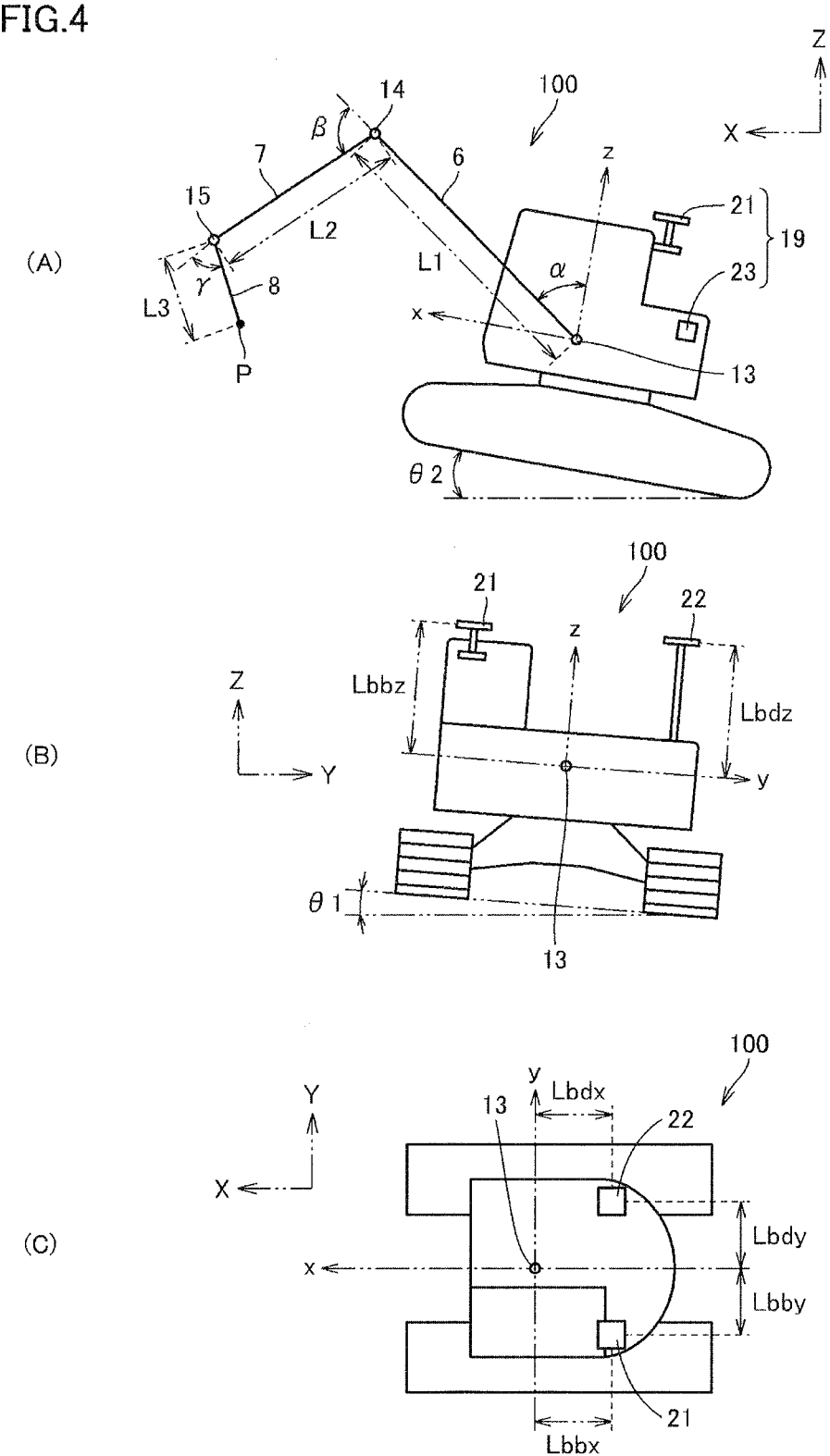
FIG. 4 is a side view (A), a rear view (B), and a plan view (C) schematically illustrating the configuration of the hydraulic excavator.
Figure 5:
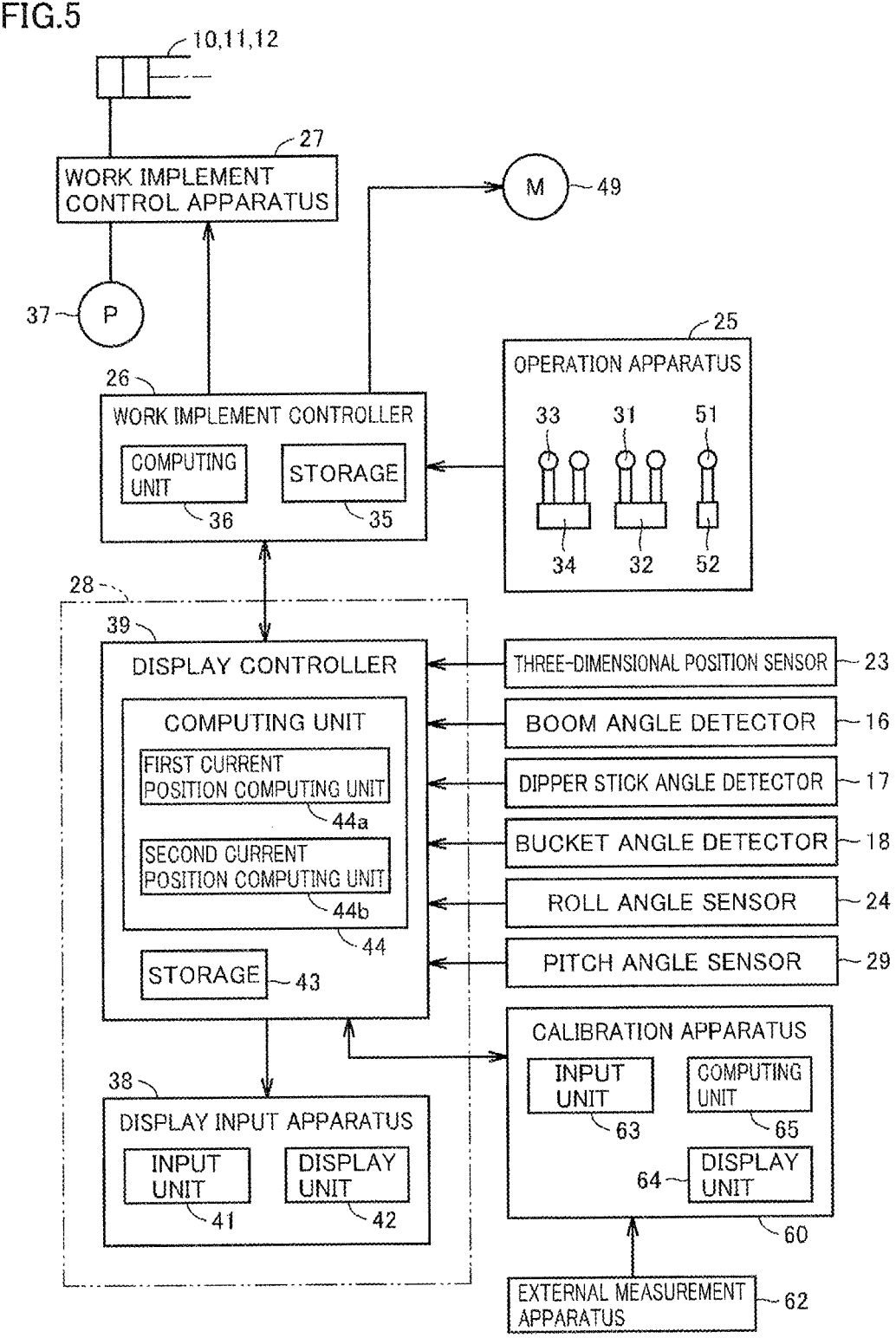
FIG. 5 is a block diagram illustrating a configuration of a control system included in the hydraulic excavator.

With reference to FIGS. 1, 4 and 5, the configuration of the hydraulic excavator of the present embodiment will be described.

FIG. 1 is a perspective view of a hydraulic excavator 100 in which calibration is performed by a calibration apparatus. Hydraulic excavator 100 includes a body (vehicular main body) 1 and a work implement 2. Body 1 includes a revolving unit 3, an operator's compartment 4, and a traveling unit 5. Revolving unit 3 is turnably attached to traveling unit 5. Revolving unit 3 accommodates apparatuses such as a hydraulic pump 37 (see FIG. 5) and an engine (not shown). Operator's compartment 4 is mounted on the front portion of revolving unit 3. A display input apparatus 38 and an operation apparatus 25 (to be described later) are disposed in operator's compartment 4 (see FIG. 5). Traveling unit 5 includes crawler belts 5a, 5b, and hydraulic excavator 100 travels by rotating crawler belts 5a, 5b.

Work implement 2 is attached to a front portion of body 1. Work implement 2 includes a boom 6, a dipper stick 7, a bucket 8, a boom cylinder 10, a dipper stick cylinder 11, and a bucket cylinder 12.

A proximal end of boom 6 is swingably attached to the front portion of body 1 via a boom pin 13. Boom pin 13 corresponds to a swinging center of boom 6 with respect to revolving unit 3. A proximal end of dipper stick 7 is swingably attached to a distal end of boom 6 via a dipper stick pin 14. Dipper stick pin 14 corresponds to a swinging center of dipper stick 7 with respect to boom 6. Bucket 8 is swingably attached to a distal end of dipper stick 7 via a bucket pin 15. Bucket pin 15 corresponds to a swinging center of bucket 8 with respect to dipper stick 7.

Each of boom cylinder 10, dipper stick cylinder 11 and bucket cylinder 12 is a hydraulic cylinder driven by hydraulic pressure. The proximal end of boom cylinder 10 is swingably attached to revolving unit 3 via a boom cylinder foot pin 10a. The distal end of boom cylinder 10 is swingably attached to boom 6 via a boom cylinder top pin 10b. Boom cylinder 10 is expanded and contracted by the hydraulic pressure, thereby driving boom 6.

The proximal end of dipper stick cylinder 11 is swingably attached to boom 6 via a dipper stick cylinder foot pin 11a. The distal end of dipper stick cylinder 11 is swingably attached to dipper stick 7 via a dipper stick cylinder top pin 11b. Dipper stick cylinder 11 is expanded and contracted by the hydraulic pressure, thereby driving dipper stick 7.

The proximal end of bucket cylinder 12 is swingably attached to dipper stick 7 via a bucket cylinder foot pin 12a. The distal end of bucket cylinder 12 is swingably attached to one end of a first link member 47 and one end of a second link member 48 via a bucket cylinder top pin 12b. The other end of first link member 47 is swingably attached to the distal end of dipper stick 7 via a first link pin 47a. The other end of second link member 48 is swingably attached to bucket 8 via a second link pin 48a. Bucket cylinder 12 is expanded and contracted by the hydraulic pressure, thereby driving bucket 8.

Two antennas 21 and 22 for RTK-GNSS are attached to body 1. For example, antenna 21 is attached to operator's compartment 4. Antenna 22 is attached to revolving unit 3 with an antenna support member 22a interposed therebetween.

Antenna support member 22a includes a rod-shape portion 22aa extending into a rod shape and a pedestal portion 22ab projecting from rod-shape portion 22aa to an outer peripheral side. Antenna support member 22a extends upward from an upper surface of revolving unit 3, and antenna 22 is attached to an upper end of antenna support member 22a.

Antennas 21 and 22 are disposed apart from each other by a fixed distance along the vehicle width direction. Antenna 21 (hereinafter, referred to as "reference antenna 21") is an antenna detecting a current position of body 1. Antenna 22 (hereinafter referred to as "directional antenna 22") is an antenna detecting an orientation of body 1 (specifically, revolving unit 3). An antenna for GPS may be used as antennas 21, 22.

Revolving unit 3 includes a soil cover 3a (cover), a sheet metal panel 3b, and an engine hood 3c as exterior panels. Each of soil cover 3a and engine hood 3c is made of, for example, resin, and openably provided. Sheet metal panel 3b is made of, for example, metal, and fixed immovably with respect to revolving unit 3. Antenna support member 22a is supported by sheet metal panel 3b while avoiding, for example, soil cover 3a and engine hood 3c.

FIGS. 4(A), 4(B), and 4(C) are a side view, a rear view, and a plan view schematically illustrating the configuration of hydraulic excavator 100. As illustrated in FIG. 4(A), a length of boom 6 (a length between boom pin 13 and dipper stick pin 14) is L1. A length of dipper stick 7 (a length between dipper stick pin 14 and bucket pin 15) is L2. A length of bucket 8 (a length between bucket pin 15 and a cutting edge P of bucket 8) is L3. Cutting edge P of bucket 8 means a middle point P in a width direction of the cutting edge of bucket 8.

Figure 2:
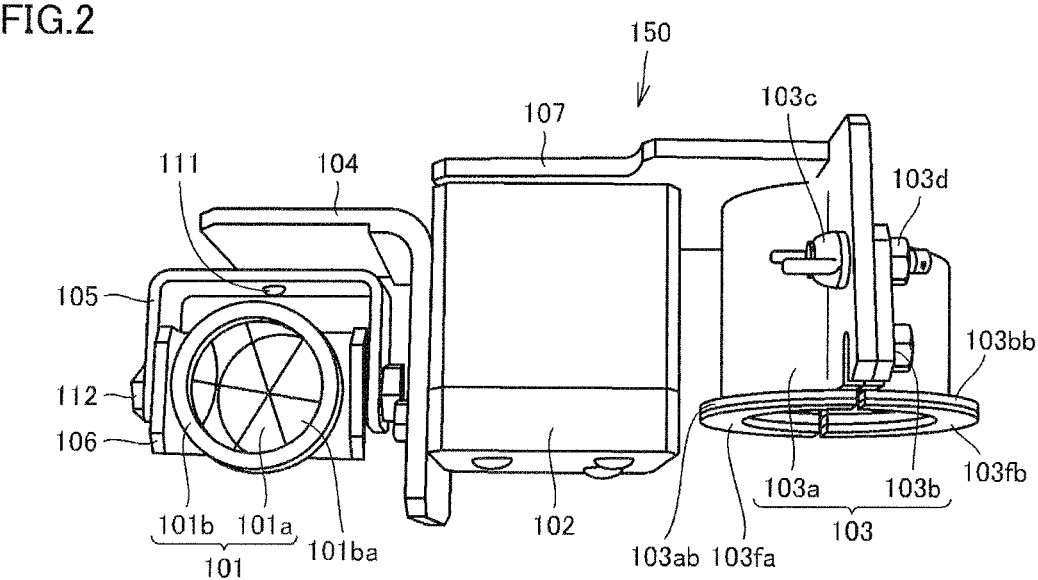
FIG. 2 is a front view illustrating a configuration of a measuring jig according to an embodiment of the present disclosure.
Figure 3:
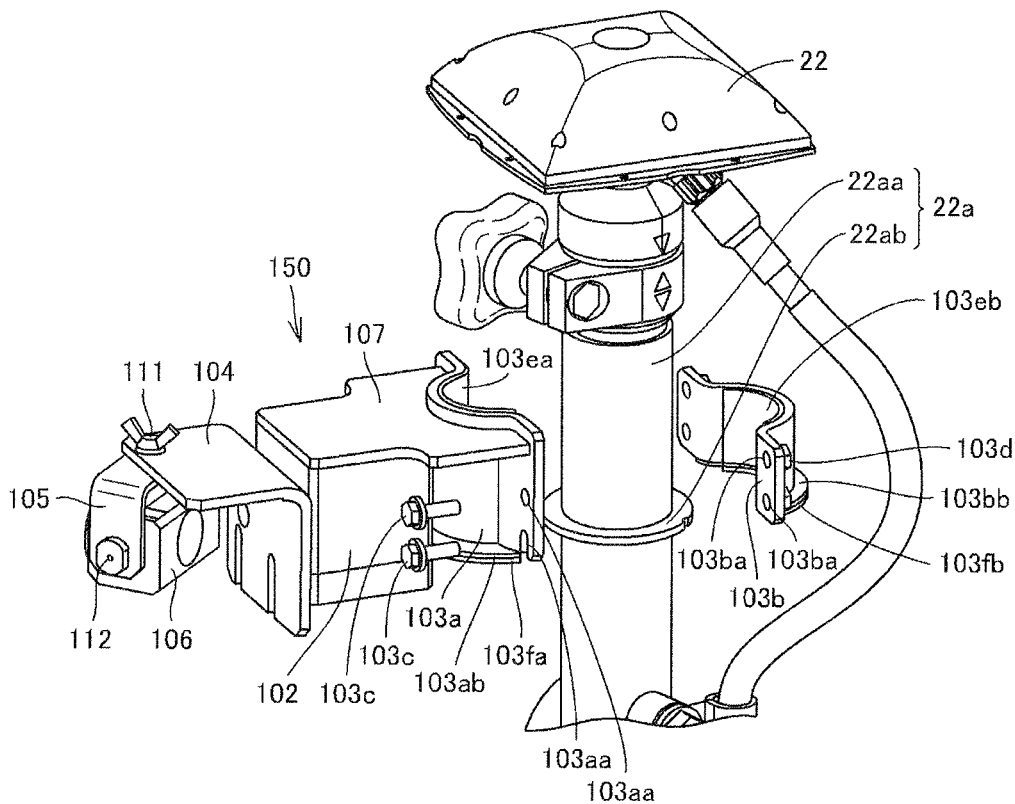
FIG. 3 is a perspective view illustrating a state in which the measuring jig in FIG. 2 is attached to the hydraulic excavator.

With reference to FIGS. 2 and 3, a configuration of the measuring jig of the present embodiment will be described below.

FIG. 2 is a front view illustrating the configuration of the measuring jig of an embodiment of the present disclosure, and FIG. 3 is a perspective view illustrating a state in which the measuring jig in FIG. 2 is attached to the hydraulic excavator. As illustrated in FIGS. 2 and 3, a measuring jig 150 of the present embodiment mainly includes a prism mirror 101, a magnet member 102, and an attachment member 103.

Prism mirror 101 reflects the projection light from an external measurement apparatus 62 (for example, the total station: FIG. 5) toward external measurement apparatus 62. Prism mirror 101 includes a prism body 101a and an exterior member 101b. Prism body 101a constitutes a reflecting surface by combining three prisms into a triangular pyramid shape. Exterior member 101b covers prism body 101a.

A triangular pyramidal apex of prism body 101a is the center of the mirror observed through external measurement apparatus 62. A circular front surface of exterior member 101b is a transparent glass surface 101ba. The light projected from external measurement apparatus 62 is incident on internal prism body 101a through glass surface 101ba, reflected by the reflecting surface of prism body 101a, and then output to external measurement apparatus 62 through glass surface 101ba as the reflected light.

Attachment member 103 is one that attaches prism mirror 101 to an attached portion (for example, antenna support member 22a) of hydraulic excavator 100 in FIG. 1. Attachment member 103 is fixed to prism mirror 101 with magnet member 102 interposed therebetween.

Prism mirror 101 is attached to magnet member 102 via a first turning unit 106, a second turning unit 105, and a fixed unit 104. Fixed unit 104 is fixed to magnet member 102. Second turning unit 105 is supported by fixed unit 104 so as to be rotatable about a rotation shaft 111 extending in a vertical direction. First turning portion 106 is supported by second turning portion 105 so as to be rotatable around a rotation shaft 112 extending in a crosswise direction. Prism mirror 101 is fixed to first turning unit 106. A direction in which rotation shaft 111 extends and a direction in which rotation shaft 112 extends may be orthogonal to each other.

Attachment member 103 includes a first member 103a and a second member 103b. First member 103a is fixed to prism mirror 101 with magnet member 102 interposed therebetween. First member 103a is fixed to magnet member 102 with a fixed unit 107. Second member 103b is formed separately from first member 103a. Second member 103b is configured to be able to be fixed to first member 103a while the attached portion is sandwiched between second member 103b and first member 103a.

For example, each of first member 103a and second member 103b has a semi-cylindrical shape. Consequently, a cylindrical space can be formed by fixing first member 103a and second member 103b to each other. The attached portion of hydraulic excavator 100 can be sandwiched between first member 103a and second member 103b by disposing the attached portion of hydraulic excavator 100 in the cylindrical space.

Each of first member 103a and second member 103b may not have the semi-cylindrical shape, but may have any shape as long as the attached portion of hydraulic excavator 100 is sandwiched between first member 103a and second member 103b.

For example, first member 103a and second member 103b can be fixed to each other by fastening members 103c, 103d. Fastening members 103c, 103d may be constructed with a bolt 103c and a nut 103d. Bolt 103c passes through both a through-hole 103aa of first member 103a and a through-hole 103ba of second member 103b, and is screwed into nut 103d. Consequently, first member 103a and second member 103b can be fixed to each other by bolt 103c and nut 103d.

For example, attachment member 103 is attached to antenna support member 22a of hydraulic excavator 100 in FIG. 3. At this point, antenna support member 22a is sandwiched between first member 103a and second member 103b of attachment member 103.

Attachment member 103 includes elastic members 103ea, 103eb, 103fa, 103fb in portions abutting on antenna support member 22a while attachment member 103 is attached to antenna support member 22a (attached portion). For example, elastic members 103ea, 103eb, 103fa, 103fb are made of rubber.

In the case that attachment member 103 includes semi-cylindrical first member 103a and second member 103b, elastic member 103ea is provided on an inner circumferential surface of semi-cylindrical first member 103a, and elastic member 103eb is provided on an inner circumferential surface of semi-cylindrical second member 103b. Each of elastic members 103ea, 103eb abuts on an outer circumferential surface of rod-shape portion 22aa of antenna support member 22a while attachment member 103 is attached to antenna support member 22a of hydraulic excavator 100.

A semi-annular flange 103ab is provided at a lower end of first member 103a, and a semi-annular flange 103bb is provided at a lower end of second member 103b. Elastic member 103fa is provided on the lower surface of flange 103ab, and elastic member 103fb is provided on the lower surface of flange 103bb. Each of elastic members 103fa, 103fb abuts on an upper surface of base portion 22ab of antenna support member 22a while attachment member 103 is attached to antenna support member 22a of hydraulic excavator 100.

Magnet member 102 is fixed to prism mirror 101. Magnet member 102 is disposed between prism mirror 101 and attachment member 103. First member 103a of attachment member 103 is fixed to magnet member 102.

(Control System of Hydraulic Excavator)

With reference to FIGS. 4 to 6A, control system of the hydraulic excavator of the present embodiment will be described.

FIG. 5 is a block diagram illustrating a configuration of the control system included in hydraulic excavator 100. As illustrated in FIG. 5, hydraulic excavator 100 includes a boom angle detector 16, a dipper stick angle detector 17, and a bucket angle detector 18. Boom angle detector 16, dipper stick angle detector 17, and bucket angle detector 18 are provided in boom 6, dipper stick 7, and bucket 8 in FIG. 4(A), respectively. For example, each of angle detectors 16 to 18 may be a potentiometer or a stroke sensor.

As illustrated in FIG. 4(A), boom angle detector 16 indirectly detects a swing angle α of boom 6 with respect to body 1. Dipper stick angle detector 17 indirectly detects a swing angle β of dipper stick 7 with respect to boom 6. Bucket angle detector 18 indirectly detects a swing angle γ of bucket 8 with respect to dipper stick 7. A method for computing swing angles α, β, γ will be described in detail later.

As illustrated in FIG. 4(A), body 1 includes a position detector 19. Position detector 19 detects the current position of body 1 of hydraulic excavator 100. Position detector 19 includes two antennas 21, 22 and a three-dimensional position sensor 23.

A signal corresponding to a GNSS radio wave received by each of antennas 21, 22 is input to three-dimensional position sensor 23. Three-dimensional position sensor 23 detects the current positions of antennas 21, 22 in a global coordinate system.

The global coordinate system is a coordinate system measured by GNSS, and is a coordinate system based on an origin fixed to the earth. On the other hand, a vehicular body coordinate system (to be described later) is a coordinate system based on the origin fixed to body 1 (specifically, revolving unit 3).

Depending on the positions of reference antenna 21 and direction antenna 22, position detector 19 detects a direction angle in the global coordinate system of an x-axis of the vehicular body coordinate system.

As illustrated in FIG. 5, body 1 includes a roll angle sensor 24 and a pitch angle sensor 29. As illustrated in FIG. 4(B), roll angle sensor 24 detects an inclination angle $\theta 1$ (hereinafter, referred to as "roll angle $\theta 1$") in the width direction of body 1 with respect to a gravity direction (vertical line). As illustrated in FIG. 4(A), pitch angle sensor 29 detects an inclination angle $\theta 2$ (hereinafter, referred to as "pitch angle $\theta 2$") in a fore/aft direction of body 1 with respect to the gravity direction.

In the present embodiment, the width direction means the width direction of bucket 8 and agrees with the vehicle width direction. However, in the case that work implement 2 has a tilt bucket (to be described later), possibly the width direction of bucket 8 does not agree with the vehicle width direction.

As illustrated in FIG. 5, hydraulic excavator 100 includes operation apparatus 25, a work implement controller 26, a work implement control apparatus 27, and hydraulic pump 37. Operation apparatus 25 includes a work implement operation member 31, a work implement operation detector 32, a travel control member 33, a travel control detector 34, a revolving control member 51, and a revolving control detector 52.

Work implement operation member 31 is one that is used to operate work implement 2 by an operator, and is, for example, a control lever. Work implement operation detector 32 detects an operation content of work implement operation member 31, and sends the operation content to work implement controller 26 as a detection signal.

Travel control member 33 is one that is used to control the travel of hydraulic excavator 100 by the operator, and is, for example, a control lever. Travel control detector 34 detects the control content of the travel control member 33, and sends the control content to work implement controller 26 as a detection signal.

Revolving control member 51 is one that is used to control the turn of revolving unit 3 by the operator, and is, for example, a control lever. Revolving control detector 52 detects the control content of revolving control member 51, and sends the control content to work implement controller 26 as a detection signal.

Work implement controller 26 includes a storage 35 and a computing unit 36. Storage 35 includes a RAM (Random Access Memory), a ROM (Read Only Memory), and the like. Computing unit 36 includes a CPU (Central Processing Unit) and the like. Work implement controller 26 mainly controls the operation of work implement 2 and the turn of revolving unit 3. Work implement controller 26 generates a control signal to operate work implement 2 according to the operation of work implement operation member 31, and outputs the control signal to work implement control apparatus 27.

Work implement control apparatus 27 includes a hydraulic control apparatus such as a proportional control valve. Work implement control apparatus 27 controls a flow rate of a hydraulic oil supplied from hydraulic pump 37 to hydraulic cylinders 10 to 12 based on the control signal from work implement controller 26. Hydraulic cylinders 10 to 12 are driven according to the hydraulic oil supplied from work implement control apparatus 27. Consequently, work implement 2 operates.

Work implement controller 26 generates a control signal to turn revolving unit 3 according to the operation of revolving control member 51, and outputs the control signal to a swing motor 49. Consequently, swing motor 49 is driven to turn revolving unit 3.

Hydraulic excavator 100 includes a display system 28. Display system 28 provides information for forming a shape like a design surface (to be described later) by excavating the ground in a work area to the operator. Display system 28 includes a display input apparatus 38 and a display controller 39.

Display input apparatus 38 includes a touch panel type input unit 41 and a display unit 42 such as an LCD (Liquid Crystal Display). Display input apparatus 38 displays a guide screen to provide the information for performing excavation. Also, various keys are displayed on the guide screen. The operator can perform various functions of display system 28 by touching various keys on the guide screen. The guide screen will be described in detail later.

Display controller 39 performs various functions of display system 28. Display controller 39 and work implement controller 26 can communicate with each other by wireless or wired communication means. Display controller 39 has a storage 43, such as a RAM and a ROM, and a computing unit 44 such as a CPU. Based on various pieces of data stored in storage 43 and a detection result of position detector 19, computing unit 44 performs various computations to display the guide screen.

Figure 6:
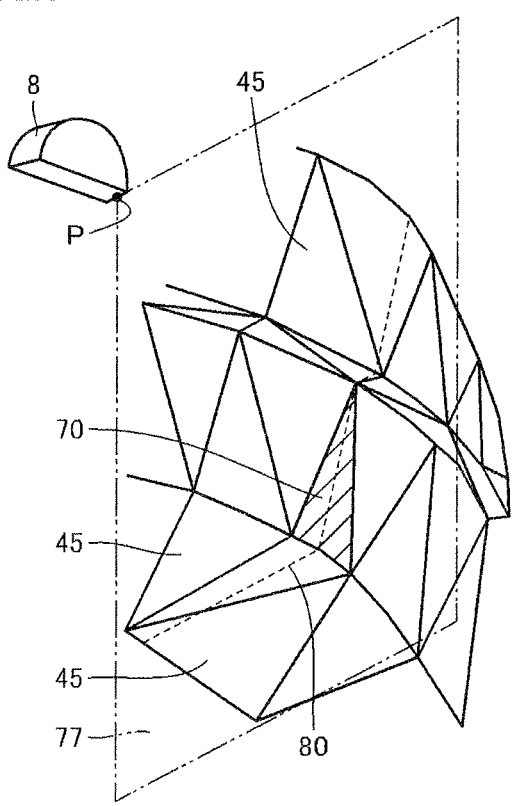
FIG. 6 is a view illustrating an example of a configuration of design topography.

In storage 43 of display controller 39, design topography data is previously produced and stored. The design topography data is information about the shape and position of the three-dimensional design topography. The design topography indicates a target shape of the ground to be worked. Display controller 39 causes display input apparatus 38 to display the guide screen based on the design topography data and data such as the detection results from the above various sensors. Specifically, as illustrated in FIG. 6, the design topography is constructed with a plurality of design surfaces 45 each expressed by triangular polygons. In FIG. 6, only a part of the plurality of design surfaces is designated by reference numeral 45, and reference numerals for other design surfaces are omitted. The operator selects one or the plurality of design surfaces 45 as a target surface 70. Display controller 39 causes display input apparatus 38 to display the guide screen to inform the operator of the position of target surface 70.

Computing unit 44 of display controller 39 computes the current position of cutting edge P of bucket 8 based on the detection result of position detector 19 and a plurality of parameters stored in storage 43. Computing unit 44 includes a first current position computing unit 44a and a second current position computing unit 44b. First current position computing unit 44a computes the current position of cutting edge P of bucket 8 in the vehicular body coordinate system based on a work implement parameter (to be described later). Second current position computing unit 44b computes the current position of cutting edge P of bucket 8 in the vehicular body coordinate system based on an antenna parameter (to be described later), the current positions of antennas 21, 22 detected by position detector 19 in the global coordinate system, and the current position of cutting edge P of bucket 8 computed by first current position computing unit 44a.

A calibration apparatus 60 is one that calibrates the parameters necessary to compute the above swing angles α, β, γ and the position of cutting edge P of bucket 8. Calibration apparatus 60 constitutes a calibration system that calibrates the above parameters together with hydraulic excavator 100 and external measurement apparatus 62.

External measurement apparatus 62 is one that measures the position of cutting edge P of bucket 8, and is, for example, a total station. Calibration apparatus 60 can conduct wired or wireless data communication with external measurement apparatus 62. Calibration apparatus 60 can also conduct wired or wireless data communication with display controller 39. Calibration apparatus 60 calibrates the parameters in FIG. 8 based on the information measured by external measurement apparatus 62. For example, the calibration of the parameters is performed during shipping of hydraulic excavator 100 or an initial setting after maintenance.

Calibration apparatus 60 includes an input unit 63, a display unit 64, and a computing unit 65 (controller). Input unit 63 is one to which first work point position information, second work point position information, antenna position information, and bucket information (to be described later) are input. Input unit 63 has a configuration in which the operator manually inputs the information, and includes, for example, a plurality of keys. Input unit 63 may be a touch panel type input unit as long as a numerical value can be input. Display unit 64 is, for example, an LCD, and is one on which an operation screen used to perform the calibration is displayed. Computing unit 65 performs processing of calibrating the parameters based on the information input through input unit 63.

(Guide Screen in Hydraulic Excavator)

Figure 7:
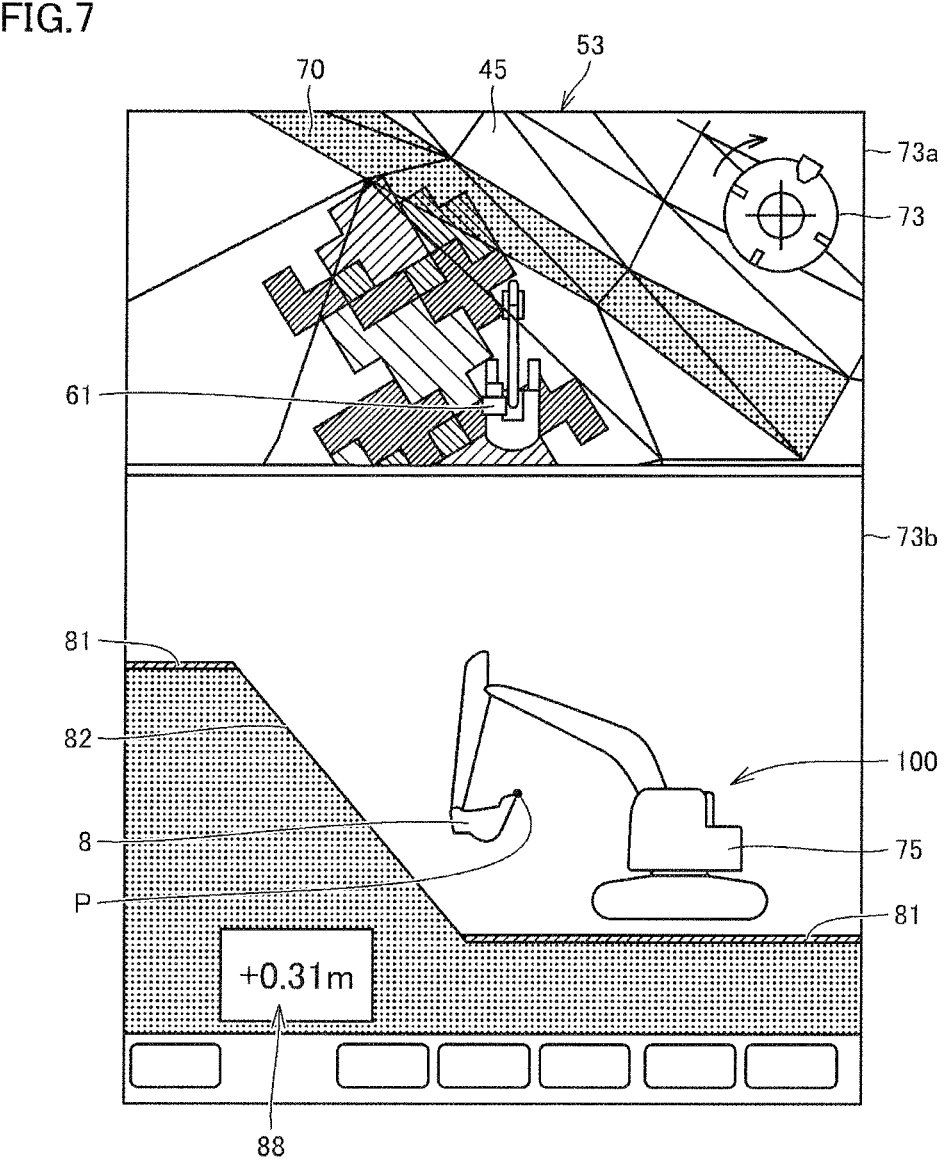
FIG. 7 is a view illustrating an example of a guide screen of the hydraulic excavator according to one embodiment of the present disclosure.

With reference to FIG. 7, the guide screen of the hydraulic excavator of the present embodiment will be described.

FIG. 7 is a view illustrating the guide screen of the hydraulic excavator of one embodiment of the present disclosure. As illustrated in FIG. 7, a guide screen 53 illustrates a positional relationship between target surface 70 and cutting edge P of bucket 8. Guide screen 53 is one that guides work implement 2 of hydraulic excavator 100 such that the ground that is of the work target becomes the same shape as target surface 70.

Guide screen 53 includes a plan view 73a and a side view 73b. Plan view 73a illustrates the design topography of a work area and the current position of hydraulic excavator 100. Side view 73b illustrates a positional relationship between target surface 70 and hydraulic excavator 100.

Plan view 73a of guide screen 53 expresses the design topography in planar view by the plurality of triangular polygons. More specifically, plan view 73a expresses the design topography with the slewing plane of hydraulic excavator 100 as a projection plane. Consequently, plan view 73a is a view as viewed from immediately above hydraulic excavator 100, and design surface 45 is inclined when hydraulic excavator 100 is inclined. Target surface 70 selected from the plurality of design surfaces 45 is displayed in a color different from that of other design surfaces 45. In FIG. 7, the current position of hydraulic excavator 100 is indicated by a hydraulic excavator icon 61 in planar view, but may be indicated by another symbol.

Plan view 73a includes information facing hydraulic excavator 100 to target surface 70. The information facing hydraulic excavator 100 to face target surface 70 is displayed as a confrontation compass 73. Confrontation compass 73 is an icon indicating a confrontation direction with respect to target surface 70 and a direction in which hydraulic excavator 100 should be turned. The operator can check a degree of confrontation with respect to target surface 70 using confrontation compass 73.

Side view 73b of guide screen 53 includes an image illustrating the positional relationship between target surface 70 and cutting edge P of bucket 8 and distance information 88 indicating a distance between target surface 70 and cutting edge P of bucket 8. Specifically, side view 73b includes a design surface line 81, a target surface line 82, and an icon 75 of hydraulic excavator 100 in side view. Design surface line 81 indicates a section of design surface 45 except for target surface 70. Target surface line 82 indicates a section of target surface 70. As illustrated in FIG. 6, design surface line 81 and target surface line 82 are obtained by computing an intersection line 80 of a plane 77 passing through the current position of a middle point P (hereinafter, simply referred to as "cutting edge P of bucket 8") in the width direction of cutting edge P of bucket 8 and design surface 45. A method of computing the current position of cutting edge P of bucket 8 will be described in detail later.

As described above, in guide screen 53, the relatively positional relationship among design surface line 81, target surface line 82, and hydraulic excavator 100 including bucket 8 is displayed as the image. By moving cutting edge P of bucket 8 along target surface line 82, the operator can easily excavate the ground such that the current topography becomes the design topography.

(Method for Computing Current Position of Cutting Edge P)

With reference to FIGS. 4, 5 and 8, a method for computing the current position of cutting edge P of bucket 8 will be described.

FIG. 8 illustrates a list of parameters stored in storage 43. As illustrated in FIG. 8, the parameters include the work implement parameter and the antenna parameter. The work implement parameter includes a plurality of parameters indicating the dimensions of each of boom 6, dipper stick 7, and bucket 8 and the swing angle. The antenna parameter includes a plurality of parameters indicating the positional relationship between each of antennas 21, 22 and boom 6.

In the computation of the current position of cutting edge P of bucket 8, as illustrated in FIG. 4, a vehicular body coordinate system x-y-z is set with an intersection of the axis of boom pin 13 and the operation plane of work implement 2 (to be described later) as an origin. In the following description, the position of boom pin 13 means the position of a midpoint of boom pin 13 in the vehicle width direction. Current swing angles α, β, γ (FIG. 4(A)) of boom 6, dipper stick 7, and bucket 8 are computed from the detection results of angle detectors 16 to 18 (FIG. 5). A method for computing swing angles α, β, γ will be described later. A coordinate (x, y, z) of cutting edge P of bucket 8 in the vehicular body coordinate system are computed by the following mathematical formula 1 using swing angles α, β, γ of boom 6, dipper stick 7, and bucket 8 and the lengths L1, L2, and L3 of boom 6, dipper stick 7, and bucket 8.

$$x = L1 \sin\alpha + L2 \sin(\alpha+\beta) + L3 \sin(\alpha+\beta+\gamma)$$

$$y = 0$$

$$z = L1 \cos\alpha + L2 \cos(\alpha+\beta) + L3 \cos(\alpha+\beta+\gamma) \quad \text{[Mathematical formula 1]}$$

The coordinate (x, y, z) of cutting edge P of bucket 8 in the vehicular body coordinate system, which is obtained from the mathematical formula 1, is transformed into a coordinate (X, Y, Z) in the global coordinate system by the following mathematical formula 2.

[Mathematical formula 2]

$$\begin{pmatrix} X \\ Y \\ Z \end{pmatrix} = \begin{pmatrix} \cos\kappa\cos\varphi & \cos\kappa\sin\varphi\sin\omega + \sin\kappa\cos\omega & -\cos\kappa\sin\varphi\cos\omega + \sin\kappa\sin\omega \\ -\sin\kappa\cos\varphi & -\sin\kappa\sin\varphi\sin\omega + \cos\kappa\cos\omega & \sin\kappa\sin\varphi\cos\omega + \cos\kappa\sin\omega \\ \sin\varphi & -\cos\varphi\sin\omega & \cos\varphi\cos\omega \end{pmatrix} \begin{pmatrix} x \\ y \\ z \end{pmatrix} + \begin{pmatrix} A \\ B \\ C \end{pmatrix}$$

Where $\omega$, $\varphi$, $\kappa$ are expressed by the following mathematical formula 3.

$$\omega = \arcsin\left(\frac{\sin\theta 1}{\cos\varphi}\right) \quad \text{[Mathematical formula 3]}$$

$$\varphi = \theta 2$$

$$\kappa = -\theta 3$$

At this point, $\theta 1$ is the roll angle as described above. $\theta 2$ is the pitch angle. $\theta 3$ is a yaw angle, which is a direction angle in the global coordinate system of the x-axis of the vehicular body coordinate system. Thus, the yaw angle $\theta 3$ is computed based on the positions of reference antenna 21 and directional antenna 22, the positions being detected by position detector 19. (A, B, C) is a coordinate of the origin in the global coordinate system in the vehicular body coordinate system.

The antenna parameter indicates the positional relationship between antennas 21, 22 and the origin in the vehicular body coordinate system (the positional relationship between antennas 21, 22 and the midpoint in the vehicle width direction of boom pin 13). Specifically, as illustrated in FIGS. 4(B) and 4(C), the antenna parameter includes a distance Lbbx between boom pin 13 and reference antenna 21 in the x-axis direction of the vehicular body coordinate system, a distance Lbby between boom pin 13 and reference antenna 21 in the y-axis direction of the vehicular body coordinate system, and a distance Lbbz between boom pin 13 and reference antenna 21 in the z-axis direction of the vehicular body coordinate system.

The antenna parameter also includes a distance Lbdx between boom pin 13 and directional antenna 22 in the x-axis direction of the vehicular body coordinate system, a distance Lbdy between boom pin 13 and directional antenna 22 in the y-axis direction of the vehicular body coordinate system, and a distance Lbdz between boom pin 13 and directional antenna 22 in the z-axis direction of the vehicular body coordinate system.

(A, B, C) is computed based on the coordinates of antennas 21, 22 in the global coordinate system, the coordinates being detected by antennas 21, 22, and the antenna parameter.

As described above, the current position (coordinate (X, Y, Z)) of cutting edge P of bucket 8 is computed in the global coordinate system.

As illustrated in FIG. 6, display controller 39 computes intersection line 80 of the three-dimensional design topography and plane 77 passing through cutting edge P of bucket 8 based on the computed current position of cutting edge P of bucket 8 and the design topography data stored in storage 43. Then, display controller 39 computes a portion passing through target surface 70 in intersection line 80 as target surface line 82 (FIG. 7). Display controller 39 also computes a portion except for target surface line 82 in intersection line 80 as design surface line 81 (FIG. 7).

(Method for Computing Swing Angles $\alpha$, $\beta$, $\gamma$)

With reference to FIGS. 9 to 13A, method of computing current swing angles $\alpha$, $\beta$, $\gamma$ of boom 6, dipper stick 7, and bucket 8 from the detection results of angle detectors 16 to 18 will be described below.

Figure 9:
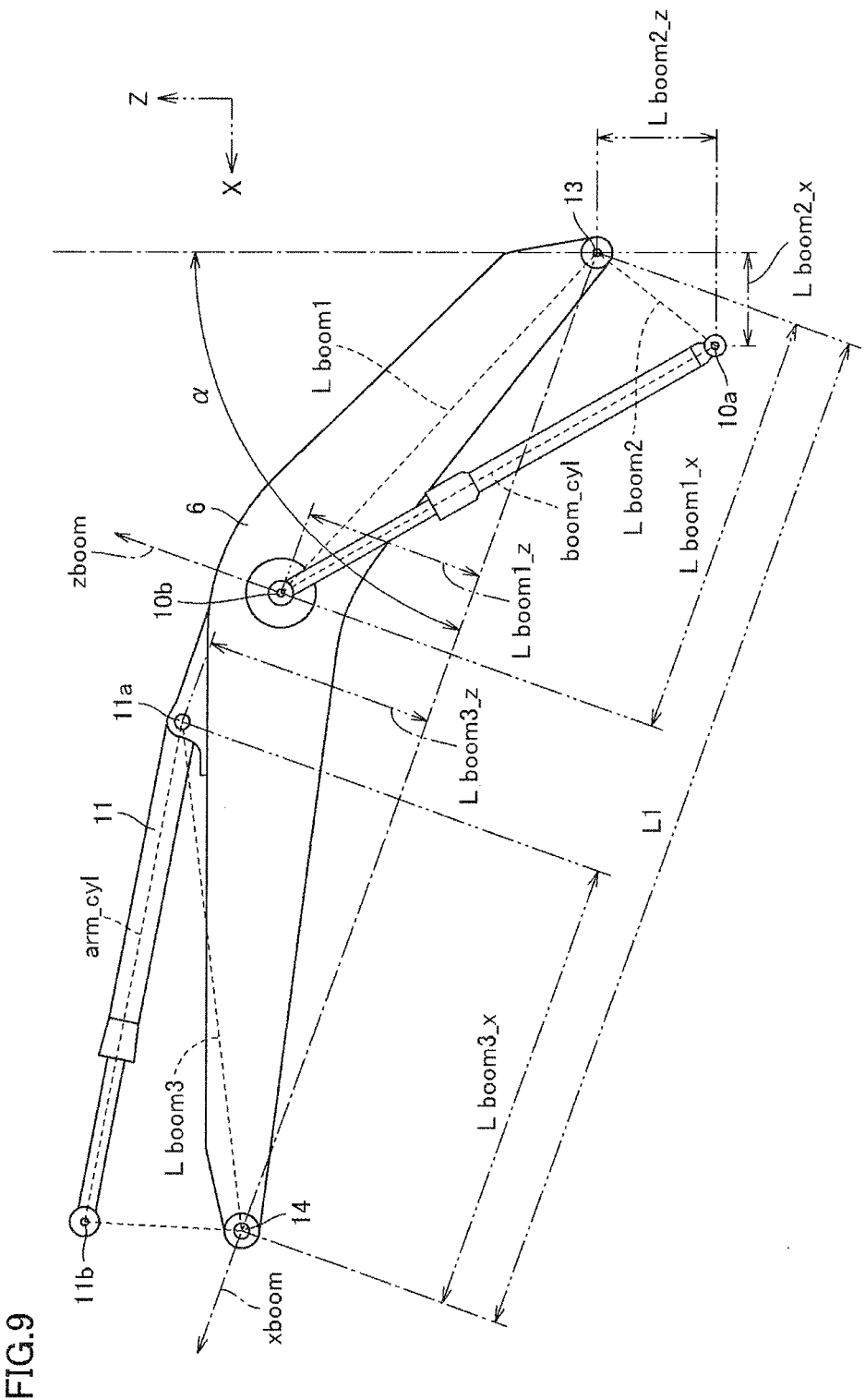
FIG. 9 is a side view of a boom.

FIG. 9 is a side view of boom 6. Swing angle $\alpha$ of boom 6 is expressed by the following mathematical formula 4 using the work implement parameters in FIG. 9.

[Mathematical formula 4]

$$\alpha = \arctan\left(-\frac{Lboom2\_x}{Lboom2\_z}\right) - \arccos\left(\frac{Lboom1^2 + Lboom2^2 - boom\_cyl^2}{2*Lboom1*Lboom2}\right) + \arctan\left(\frac{Lboom1\_z}{Lboom1\_x}\right)$$

As illustrated in FIG. 9, Lboom2_x is a distance between boom cylinder foot pin 10a and boom pin 13 in the horizontal direction (corresponding to the x-axis direction of the vehicular body coordinate system) of body 1. Lboom2_z is a distance between boom cylinder foot pin 10a and boom pin 13 in the perpendicular direction (corresponding to the z-axis direction of the vehicular body coordinate system) of body 1. Lboom1 is a distance between boom cylinder top pin 10b and boom pin 13. Lboom2 is a distance between boom cylinder foot pin 10a and boom pin 13. boom_cyl is a distance between boom cylinder foot pin 10a and boom cylinder top pin 10b.

It is assumed that a direction connecting boom pin 13 and dipper stick pin 14 in side view is an xboom axis, and that a direction perpendicular to the xboom axis is a zboom axis. Lboom1_x is a distance between boom cylinder top pin 10b and boom pin 13 in the xboom axis direction. Lboom1_z is a distance between boom cylinder top pin 10b and boom pin 13 in the zboom axis direction.

Figure 10:
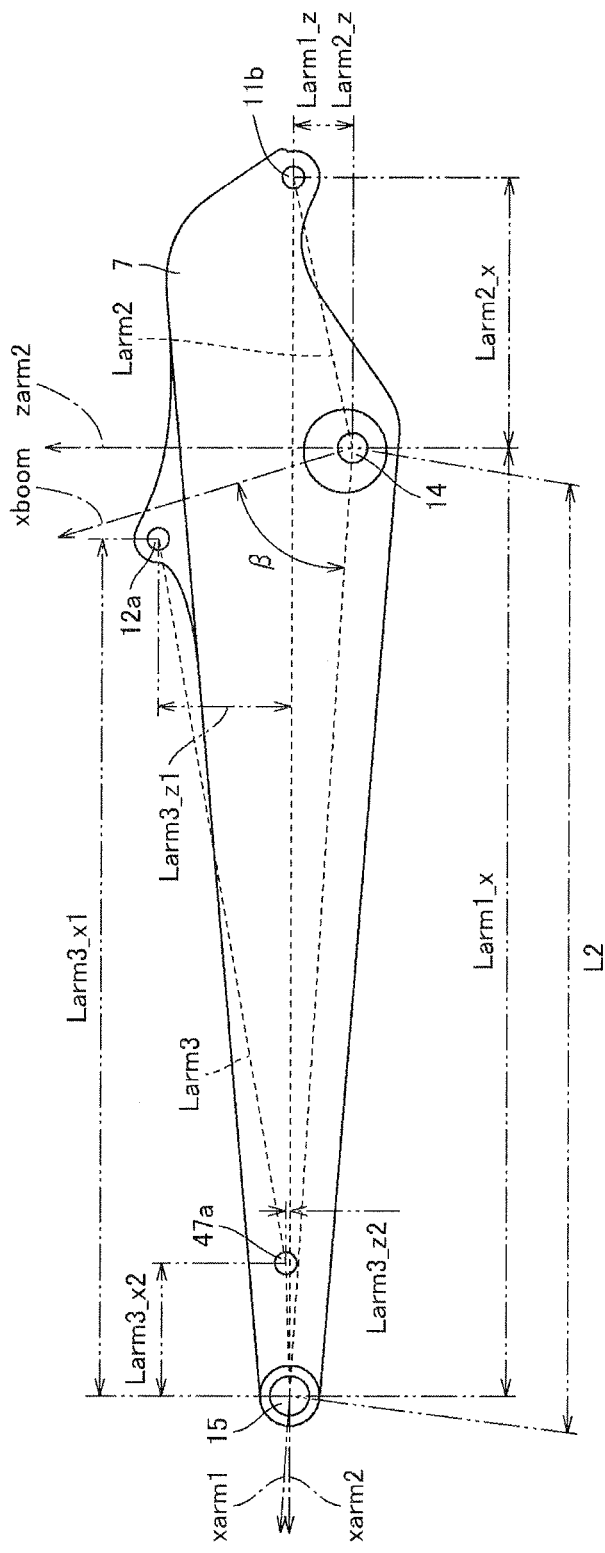
FIG. 10 is a side view of a dipper stick.

FIG. 10 is a side view of dipper stick 7. The swinging angle $\beta$ of dipper stick 7 is expressed by the following mathematical formula 5 using the work implement parameters shown in FIGS. 9 and 10.

[Mathematical formula 5]

$$\beta = \arctan\left(-\frac{Lboom3\_z}{Lboom3\_x}\right) - \arccos\left(\frac{Lboom3^2 + Larm2^2 - arm\_cyl^2}{2*Larm3*Larm2}\right) + \arctan\left(\frac{Larm2\_x}{Larm2\_z}\right) + \arctan\left(\frac{Larm1\_x}{Larm1\_z}\right) - \pi$$

As illustrated in FIG. 9, Lboom3_x is a distance between dipper stick cylinder foot pin 11a and dipper stick pin 14 in the xboom axis direction. Lboom3_z is a distance between dipper stick cylinder foot pin 11*a* and dipper stick pin 14 in the zboom axis direction. Lboom3 is a distance between dipper stick cylinder foot pin 11*a* and dipper stick pin 14. arm_cyl is a distance between dipper stick cylinder foot pin 11*a* and dipper stick cylinder top pin 11*b*.

As illustrated in FIG. 10, it is assumed that a direction connecting dipper stick cylinder top pin 11*b* and bucket pin 15 in a side view is an xarm2 axis, and that a direction perpendicular to the xarm2 axis is a zarm 2 axis. It is assumed that a direction connecting dipper stick pin 14 and bucket pin 15 in side view is an xarm1 axis.

Larm2 is a distance between dipper stick cylinder top pin 11*b* and dipper stick pin 14. Larm2_x is a distance between dipper stick cylinder top pin 11*b* and dipper stick pin 14 in the xarm2 axis direction. Larm2_z is a distance between dipper stick cylinder top pin 11*b* and dipper stick pin 14 in the zarm2 axis direction.

Larm1_x is a distance between dipper stick pin 14 and bucket pin 15 in the xarm2 axis direction. Larm1_z is a distance between dipper stick pin 14 and bucket pin 15 in the zarm2 axis direction. Swing angle β of dipper stick 7 is an angle formed between the xboom axis and the xarm1 axis.

Figure 11:
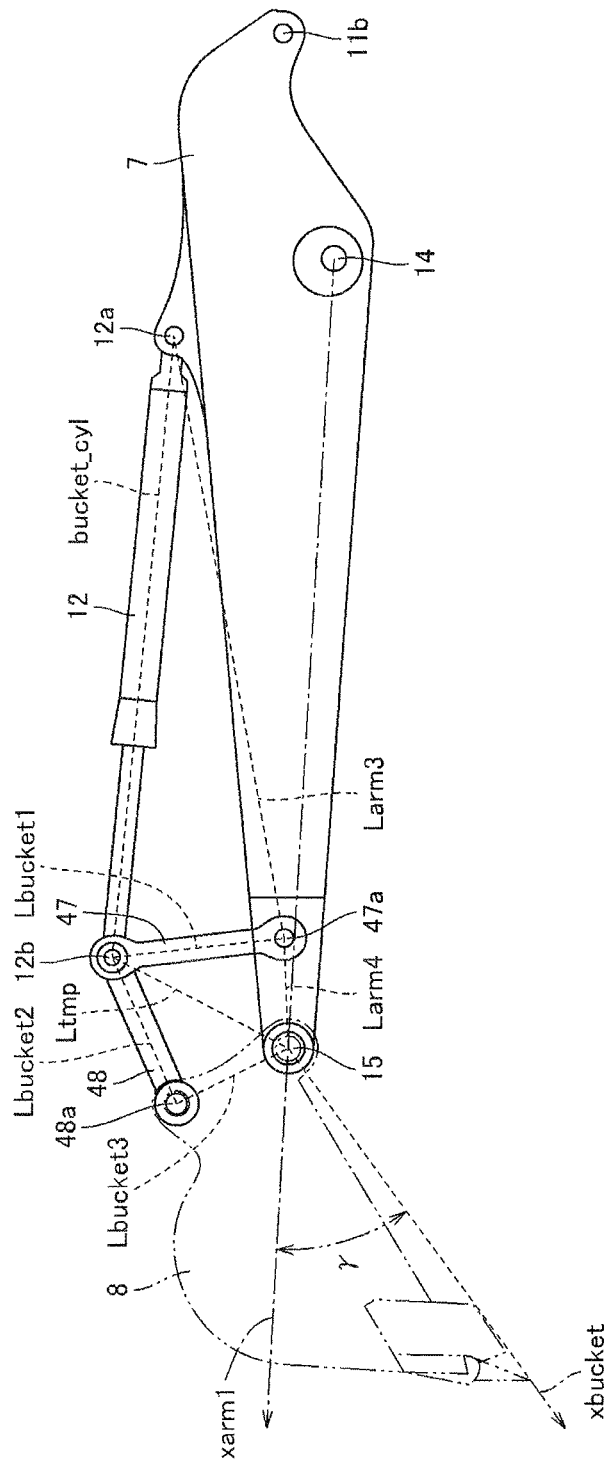
FIG. 11 is a side view of a bucket and the dipper stick.
Figure 12:
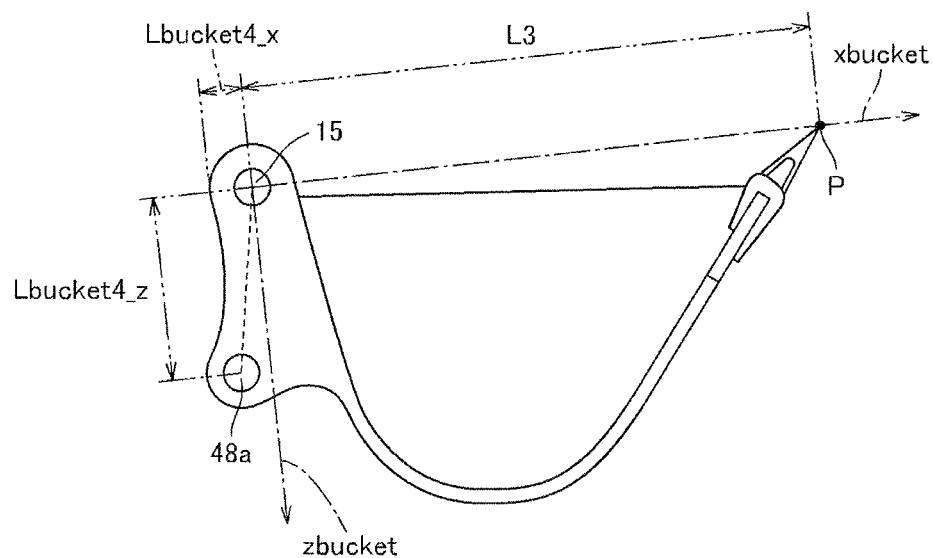
FIG. 12 is a side view of the bucket.

FIG. 11 is a side view of bucket 8 and dipper stick 7. FIG. 12 is a side view of bucket 8. The swing angle γ of bucket 8 is expressed by the following mathematical formula 6 using the work implement parameters shown in FIGS. 10 to 12.

[Mathematical formula 6]

$$\gamma = \arctan\left(\frac{Larm1\_z}{Larm1\_x}\right) + \arctan\left(\frac{Larm3\_z2}{Larm3\_x2}\right) +$$
$$\arccos\left(\frac{Ltmp^2 + Larm4^2 - Lbucket1^2}{2*Ltmp*Larm4}\right) +$$
$$\arccos\left(\frac{Ltmp^2 + Lbucket3^2 - Lbucket2^2}{2*Ltmp*Lbucket3}\right) +$$
$$\arctan\left(\frac{Lbucket4\_x}{Lbucket4\_z}\right) + \frac{\pi}{2} - \pi$$

As illustrated in FIG. 10, Larm3_z2 is a distance between first link pin 47*a* and bucket pin 15 in the zarm2 axis direction. Larm3_x2 is a distance between first link pin 47*a* and bucket pin 15 in the xarm2 axis direction.

As illustrated in FIG. 11, Ltmp is a distance between bucket cylinder top pin 12*b* and bucket pin 15. Larm4 is a distance between first link pin 47*a* and bucket pin 15. Lbucket1 is a distance between bucket cylinder top pin 12*b* and first link pin 47*a*. Lbucket2 is a distance between bucket cylinder top pin 12*b* and second link pin 48*a*. Lbucket3 is a distance between bucket pin 15 and second link pin 48*a*. The swing angle γ of bucket 8 is an angle formed between an xbucket axis and the xarm1 axis.

As illustrated in FIG. 12, it is assumed that a direction connecting bucket pin 15 and cutting edge P of bucket 8 in side view is the xbucket axis, and that a direction perpendicular to the xbucket axis is a zbucket axis. Lbucket4_x is a distance between bucket pin 15 and second link pin 48*a* in the xbucket axis direction. Lbucket4_z is a distance between bucket pin 15 and second link pin 48*a* in the zbucket axis direction.

The above Ltmp is expressed by the following mathematical formula 7.

[Mathematical formula 7]

$$Ltmp = \sqrt{Larm4^2 + Lbucket1^2 - 2Larm4*Lbucket1*\cos\phi}$$
$$\phi = \pi + \sqrt{\frac{Larm3\_z2}{Larm3\_x2}} - \sqrt{\frac{Larm3\_z1 - Larm3\_z2}{Larm3\_x1 - Larm3\_x2}} -$$
$$\arccos\left(\frac{Lbucket1^2 + Larm3^2 - bucket\_cyl^2}{2*Lbucket1*Larm3}\right)$$

As illustrated in FIG. 10, Larm3 is a distance between bucket cylinder foot pin 12*a* and first link pin 47*a*. Larm3_x1 is a distance between bucket cylinder foot pin 12*a* and bucket pin 15 in the xarm2 axis direction. Larm3_z1 is a distance between bucket cylinder foot pin 12*a* and bucket pin 15 in the zarm2 axis direction.

Figure 13:
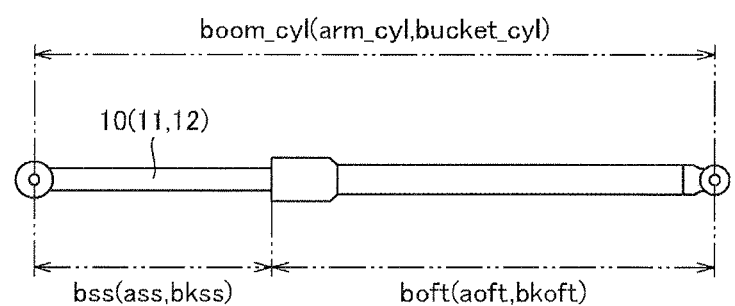
FIG. 13 is a view illustrating a method for computing a parameter indicating a cylinder length.

As illustrated in FIG. 13, the boom_cyl is a value obtained by adding a boom cylinder offset boft to a stroke length bss of boom cylinder 10, the stroke length bss being detected by boom angle detector 16. Similarly, arm_cyl is a value obtained by adding a dipper stick cylinder offset aoft to a stroke length ass of dipper stick cylinder 11, the stroke length ass being detected by dipper stick angle detector 17. Similarly, bucket_cyl is a value obtained by adding a bucket cylinder offset bkoft including a minimum distance of bucket cylinder 12 to a stroke length bkss of bucket cylinder 12, the stroke length bkss being detected by bucket angle detector 18.

As described above, current swing angles α, β, γ of boom 6, dipper stick 7, and bucket 8 are obtained by the computation from the detection results of angle detectors 16 to 18.

(Calibration Work by Operator)

With reference to FIGS. 2, 4, and 14 to 18, the calibration work by the operator in the hydraulic excavator of the present embodiment will be described below.

Figure 14:
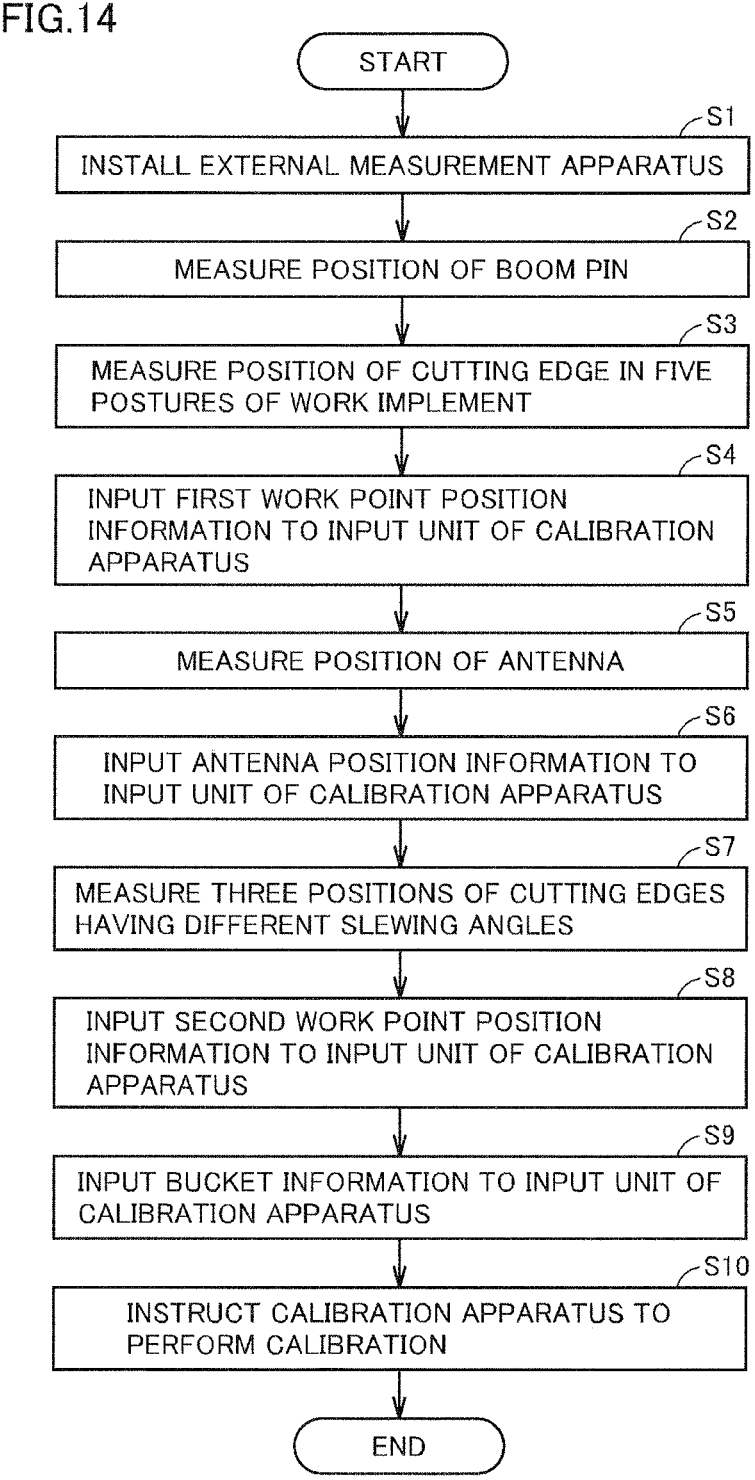
FIG. 14 is a flowchart illustrating a work procedure performed by the operator during calibration.
Figure 15:
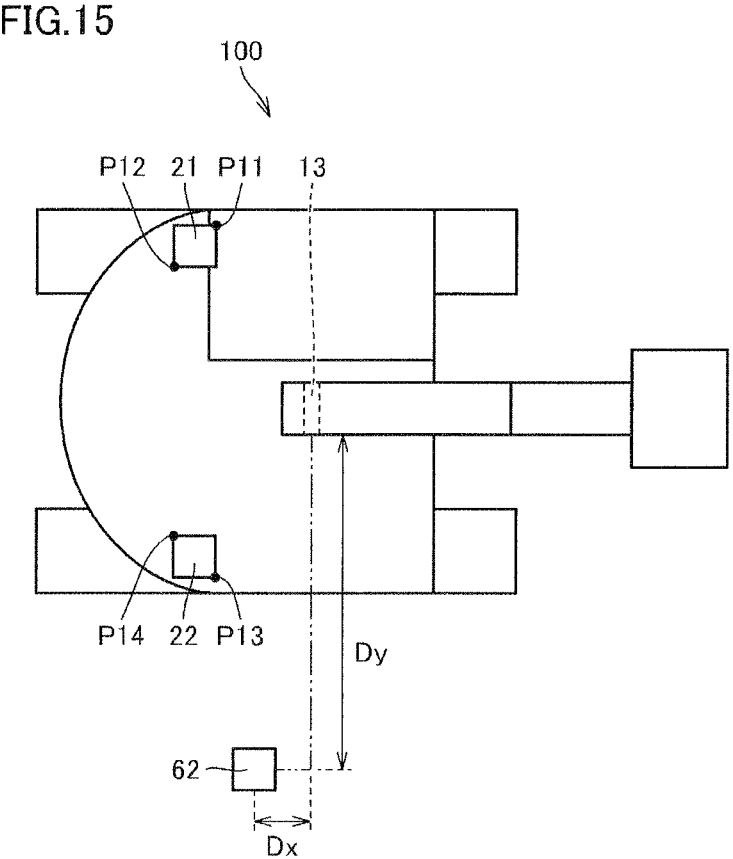
FIG. 15 is a view illustrating a position where an external measurement apparatus is installed.

FIG. 14 is a flowchart illustrating a work procedure performed by the operator during the calibration. As illustrated in FIG. 14, in step S1, the operator installs external measurement apparatus 62. At this point, as illustrated in FIG. 15, the operator installs external measurement apparatus 62 just behind boom pin 13 with a predetermined distance Dx and just beside boom pin 13 with a predetermined distance Dy. In step S2, the operator measures a center position in an end surface (side surface) of boom pin 13 using external measurement apparatus 62.

In step S3, the operator measures the position of cutting edge P in the five postures of work implement 2 using external measurement apparatus 62. The operator operates work implement operation member 31 to move the position of cutting edge P of bucket 8 to five positions, namely, a first position P1 to a fifth position P5 shown in FIG. 16.

At this point, revolving unit 3 does not turn, but maintains a state in which revolving unit 3 is fixed to traveling unit 5. Then, the operator measures the coordinates of cutting edge P at each of first position P1 to fifth position P5 using external measurement apparatus 62. First position P1 and second position P2 are different from each other in a fore/aft direction of the body on the ground. Third position P3 and fourth position P4 are different from each other in the fore/aft direction of the body in the air. Third position P3 and fourth position P4 are different from each other in the vertical direction with respect to first position P1 and second position P2. Fifth position P5 is a position among first position P1, second position P2, third position P3, and fourth position P4.

Figures 16, 17:
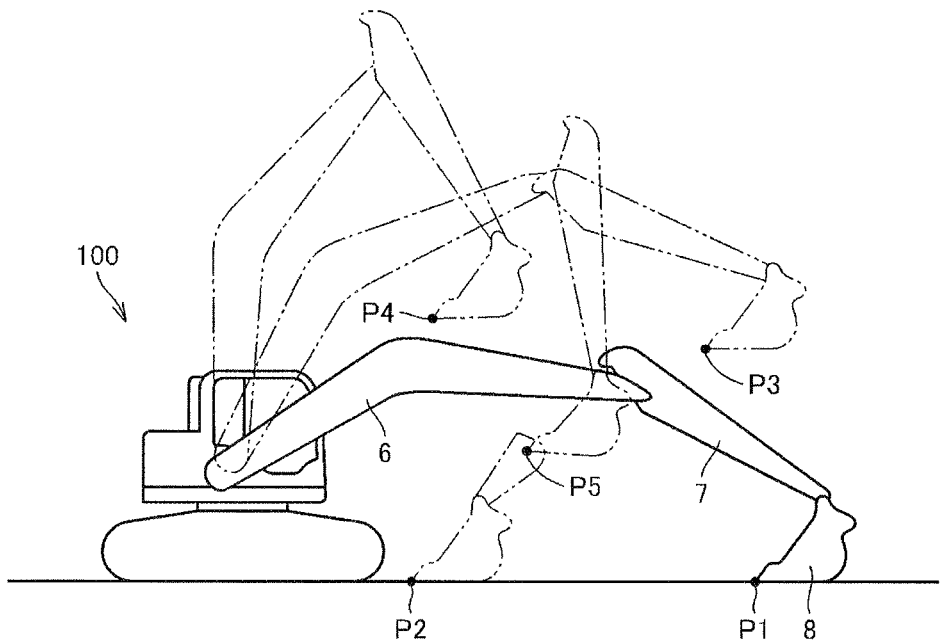
FIG. 16 is a side view illustrating a position of a cutting edge in five postures of a work implement.
FIG. 17 is a table illustrating a stroke length of a cylinder at each of first to fifth positions.

FIG. 17 illustrates the stroke lengths of cylinders 10 to 12 at each of first position P1 to fifth position P5 with the maximum of 100% and the minimum of 0%. As illustrated in FIG. 17, the stroke length of dipper stick cylinder 11 is the minimum at first position P1. That is, first position P1 is the position of cutting edge P in the posture of the work implement in which the swing angle of dipper stick 7 becomes the minimum.

At second position P2, the stroke length of dipper stick cylinder 11 is the maximum. That is, second position P2 is the position of cutting edge P in the posture of the work implement in which the swing angle of dipper stick 7 becomes the maximum.

At third position P3, the stroke length of dipper stick cylinder 11 is the minimum, and the stroke length of bucket cylinder 12 is the maximum. That is, third position P3 is the position of cutting edge P in the posture of work implement 2 in which the swing angle of dipper stick 7 becomes the minimum while the swing angle of bucket 8 becomes the maximum.

At fourth position P4, the stroke length of boom cylinder 10 is the maximum. That is, fourth position P4 is the position of cutting edge P in the posture of work implement 2 in which the swing angle of boom 6 becomes the maximum.

At fifth position P5, the cylinder lengths of dipper stick cylinder 11, boom cylinder 10, and bucket cylinder 12 are intermediate values which are neither the minimum nor the maximum. That is, at fifth position P5, the swing angles of dipper stick 7, boom 6, and bucket 8 are the intermediate values which are neither the maximum nor the minimum.

In step S4, the operator inputs the first work point position information to input unit 63 of calibration apparatus 60. The first work point position information indicates the coordinates at first position P1 to fifth position P5 of cutting edge P of bucket 8, the coordinates being measured by external measurement apparatus 62. Thus, the operator inputs the coordinates at first position P1 to fifth position P5 of cutting edge P of bucket 8 to input unit 63 of calibration apparatus 60, the coordinates being measured by external measurement apparatus 62 in step S4.

In step S5, the operator measures the positions of the antennas 21, 22 using external measurement apparatus 62. At this point, as illustrated in FIG. 15, the operator measures the positions of a first measurement point P11 and a second measurement point P12 on reference antenna 21 using external measurement apparatus 62. First measurement point P11 and second measurement point P12 are symmetrically disposed with respect to the center of the upper surface of reference antenna 21. When the upper surface of reference antenna 21 has a rectangular or square shape, first measurement point P11 and second measurement point P12 are two diagonal points on the upper surface of reference antenna 21.

As illustrated in FIG. 15, the operator measures the positions of a third measurement point P13 and a fourth measurement point P14 on directional antenna 22 using external measurement apparatus 62. Third measurement point P13 and fourth measurement point P14 are symmetrically disposed with respect to the center of the upper surface of directional antenna 22. Similarly to first measurement point P11 and second measurement point P12, third measurement point P13 and fourth measurement point P14 are two diagonal points on the upper surface of directional antenna 22.

It is preferable to put a mark on first measurement point P11 to fourth measurement point P14 in order to facilitate the measurement. For example, the bolt included as a part of antennas 21, 22 may be used as the mark.

In step S6, the operator inputs the antenna position information to input unit 63 of calibration apparatus 60. The antenna position information includes the coordinates indicating the positions of first measurement point P11 to fourth measurement point P14, the coordinates being measured by the operator using external measurement apparatus 62 in step S5.

Figure 18:
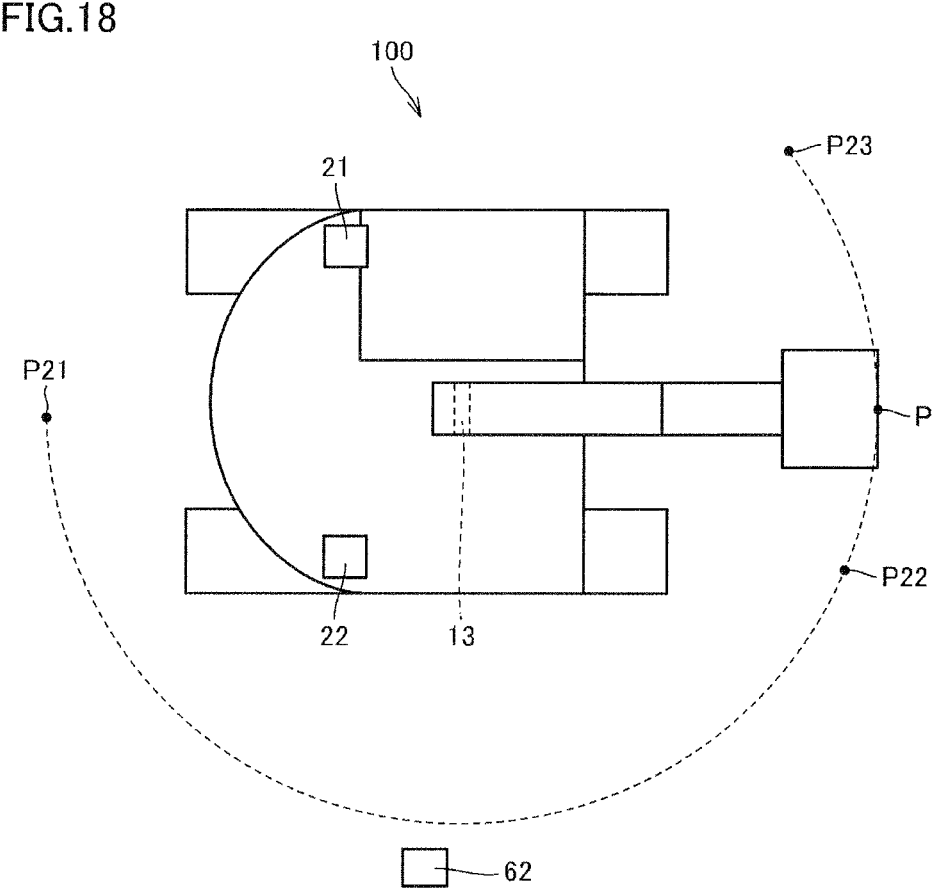
FIG. 18 is a plan view illustrating the positions of three cutting edges having different slewing angles.

In step S7, the operator measures three positions of cutting edges P having different slewing angles. In this case, as illustrated in FIG. 18, the operator operates revolving control member 51 to turn revolving unit 3. At this point, the posture of work implement 2 is maintained in a fixed state. Then, the operator measures the three positions (hereinafter, referred to as "first slewing position P21", "second slewing position P22", "third slewing position P23") of cutting edges P having different slewing angles using external measurement apparatus 62.

At this point, as illustrated in FIG. 3, measuring jig 150 is attached to antenna support member 22a. Revolving unit 3 is turned such that the position of cutting edge P becomes first slewing position P21 while measuring jig 150 is attached to antenna support member 22a. The position of each part of measuring jig 150 is adjusted such that the projected light projected from external measurement apparatus 62 is reflected by prism mirror 101 and returned to external measurement apparatus 62 while the position of cutting edge P becomes first slewing position P21. Specifically, the rotation angle position of measuring jig 150 with respect to antenna support member 22a and the position of prism mirror 101 are adjusted. Then, the projection light is projected from external measurement apparatus 62 onto prism mirror 101 of measuring jig 150, and the reflected light from prism mirror 101 is measured, thereby measuring the position of cutting edge P at first slewing position P21.

Then, revolving unit 3 is turned such that the position of cutting edge P becomes second slewing position P22. Similarly the position of each part of measuring jig 150 is adjusted such that the projection light projected from external measurement apparatus 62 is reflected by prism mirror 101 and returned to external measurement apparatus 62 while the position of cutting edge P becomes second slewing position P22. Then, the projection light is projected from external measurement apparatus 62 onto prism mirror 101 of measuring jig 150 while the position of cutting edge P becomes second slewing position P22, and the reflected light from prism mirror 101 is measured, thereby measuring the position of cutting edge P at second slewing position P22.

Further, revolving unit 3 is turned such that the position of cutting edge P becomes third slewing position P23. The position of each part of measuring jig 150 is adjusted such that the projection light projected from external measurement apparatus 62 is reflected by prism mirror 101 and returned to external measurement apparatus 62 while the position of cutting edge P becomes third slewing position P23. Then, the projection light is projected from external measurement apparatus 62 onto prism mirror 101 of measuring jig 150 while the position of cutting edge P becomes third slewing position P23, and the reflected light from prism mirror 101 is measured, thereby measuring the position of cutting edge P at third slewing position P23.

In step S8, the operator inputs the second work point position information to input unit 63 of calibration apparatus 60. The second work point position information includes coordinates indicating first slewing position P21, second slewing position P22, and third slewing position P23, the coordinates being measured by the operator using external measurement apparatus 62 in step S7.

In step S9, the operator inputs the bucket information to input unit 63 of calibration apparatus 60. The bucket information is information about the dimensions of bucket 8. The bucket information includes the distance (Lbucket4_x) between bucket pin 15 and second link pin 48a in the xbucket axis direction and the distance (Lbucket4_z) between bucket pin 15 and second link pin 48a in the zbucket axis direction. The operator inputs the design value or the value measured by measuring means such as external measurement apparatus 62 as the bucket information.

In step S10, the operator instructs calibration apparatus 60 to perform the calibration.

(Calibration Method Performed by Calibration Apparatus 60)

With reference to FIGS. 5, 8, and 19 to 21, the processing performed by calibration apparatus 60 will be described below.

Figure 19:
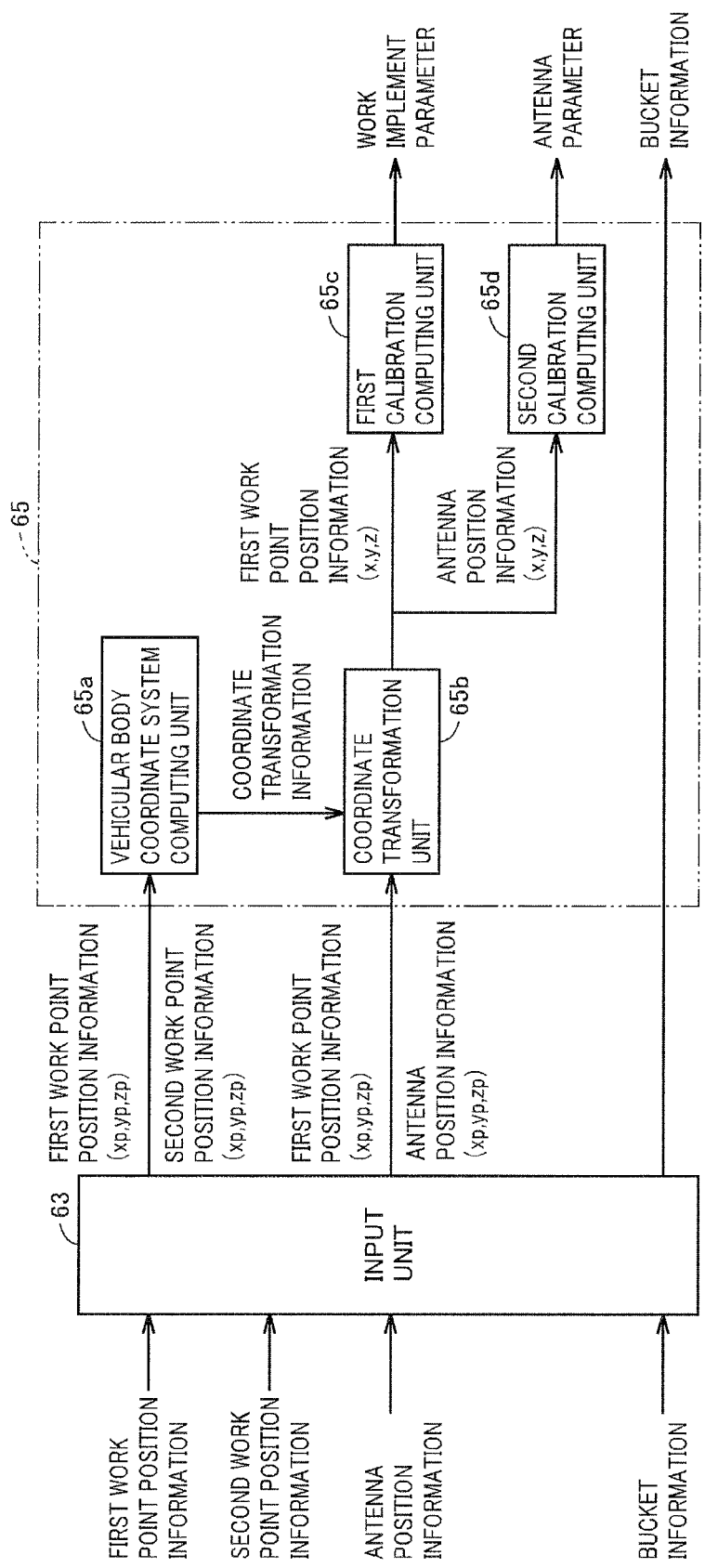
FIG. 19 is a functional block diagram illustrating a processing function related to calibration of a calibration apparatus.

FIG. 19 is a functional block diagram illustrating a processing function related to the calibration of computing unit 65. As illustrated in FIG. 19, computing unit 65 includes a vehicular body coordinate system computing unit 65a, a coordinate transformation unit 65b, a first calibration computing unit 65c, and a second calibration computing unit 65d.

Vehicular body coordinate system computing unit 65a computes coordinate transformation information based on the first work point position information and second work point position information, which are input by input unit 63. The coordinate transformation information is information transforming the coordinate system based on external measurement apparatus 62 into the vehicular body coordinate system. Because the first work point position information and the antenna position information are measured by external measurement apparatus 62, the first work point position information and the antenna position information are expressed by a coordinate system (xp, yp, zp) based on external measurement apparatus 62. The coordinate transformation information is information transforming the first work point position information and the antenna position information from the coordinate system based on external measurement apparatus 62 into the vehicular body coordinate system (x, y, z). A method for computing the coordinate transformation information will be described below.

Figure 20:
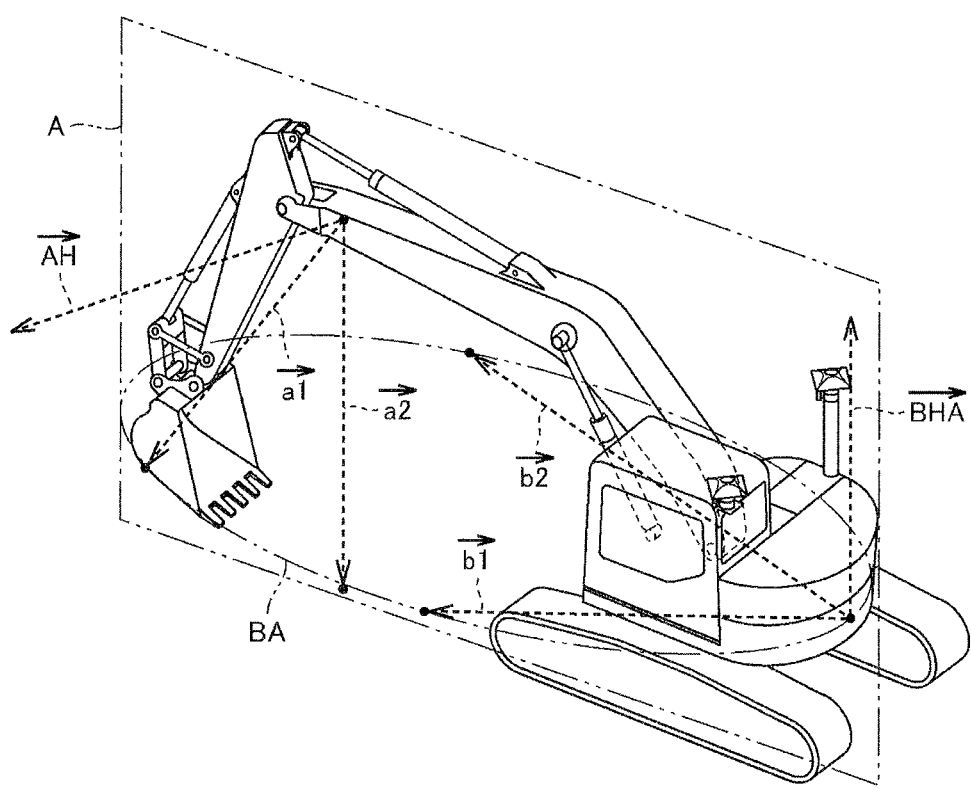
FIG. 20 is a view illustrating a method for computing coordinate transformation information.

As illustrated in FIGS. 19 and 20, vehicular body coordinate system computing unit 65a computes a first unit normal vector AH perpendicular to a motion plane A of work implement 2 based on the first work point position information. Vehicular body coordinate system computing unit 65a computes the motion plane of work implement 2 using the least squares method from the five positions included in the first work point position information, and computes first unit normal vector AH based on the calculated motion plane. First unit normal vector AH may be computed based on two vectors a1, a2 obtained from the coordinates of three positions that do not deviate from the other two positions out of the five positions included in the first work point position information.

Then, vehicular body coordinate system computing unit 65a computes a second unit normal vector BHA perpendicular to a slewing plane BA of revolving unit 3 based on the second work point position information. Specifically, vehicular body coordinate system computing unit 65a computes second unit normal vector BHA perpendicular to slewing plane BA based on two vectors b1, b2 obtained from the coordinates of first slewing position P21, second slewing position P22, and third slewing position P23 (FIG. 18), which are included in the second work point position information.

Figure 21:
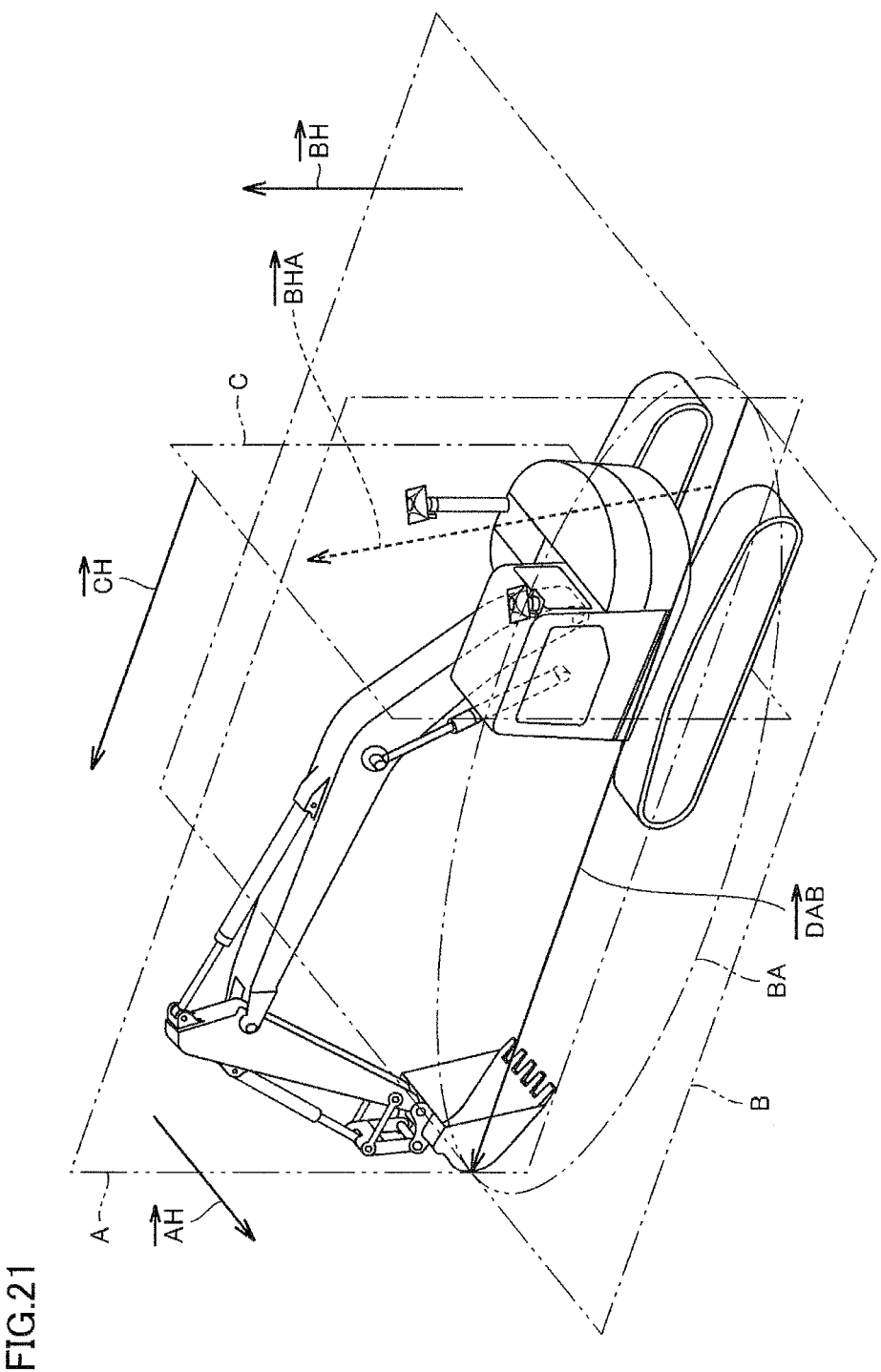
FIG. 21 is a diagram illustrating the method for computing the coordinate transformation information.

Then, as illustrated in FIG. 21, vehicular body coordinate system computing unit 65a computes an intersection line vector DAB of motion plane A of work implement 2 and slewing plane BA. Vehicular body coordinate system computing unit 65a computes the unit normal vector of a plane B, which passes through the intersection line vector DAB and is perpendicular to motion plane A of work implement 2, as corrected second unit normal vector BH. Then, vehicular body coordinate system computing unit 65a computes a third unit normal vector CH perpendicular to first unit normal vector AH and corrected second unit normal vector BH. Third unit normal vector CH is a normal vector of a plane C perpendicular to both motion plane A and plane B.

Coordinate transformation unit 65b transforms the first work point position information and antenna position information, which are measured by external measurement apparatus 62, from the coordinate system (xp, yp, zp) in external measurement apparatus 62 into the vehicular body coordinate system (x, y, z) in hydraulic excavator 100, using the coordinate transformation information. The coordinate transformation information includes first unit normal vector AH, corrected second unit normal vector BH, and third unit normal vector CH. Specifically, as indicated by the following mathematical formula 8, the coordinates in the body coordinate system are computed by an inner product of the coordinates in the coordinate system of external measurement apparatus 62 indicated by a vector p and normal vectors AB, BH, CH of the coordinate transformation information.

$$x = \vec{p} \cdot \vec{CH}$$

$$y = \vec{p} \cdot \vec{AH}$$

$$z = \vec{p} \cdot \vec{BH} \qquad \text{[Mathematical formula 8]}$$

First calibration computing unit 65c computes the calibration value of the parameter using a numerical analysis based on the first work point position information transformed into the vehicular body coordinate system. Specifically, as indicated by the following mathematical formula 9, the calibration value of the parameter is computed by the least square method.

[Mathematical formula 9]

$$J = \frac{1}{2}\sum_{k=1}^{n}\{L1\sin(\alpha k) + L2\sin(\alpha k + \beta k) + L3\sin(\alpha k + \beta k + \gamma k) - xk\}^2 +$$

$$\frac{1}{2}\sum_{k=1}^{n}\{L1\cos(\alpha k) + L2\cos(\alpha k + \beta k) + L3\cos(\alpha k + \beta k + \gamma k) - zk\}^2$$

The value of k corresponds to first position P1 to fifth position P5 of the first work point position information. Thus, n=5. (x1, z1) is a coordinate of first position P1 in the vehicular body coordinate system. (x2, z2) is a coordinate of second position P2 in the vehicular body coordinate system. (x3, z3) is a coordinate of third position P3 in the vehicular body coordinate system. (x4, z4) is a coordinate of fourth position P4 in the vehicular body coordinate system. (x5, z5) is a coordinate of fifth position P5 in the vehicular body coordinate system.

The calibration value of the work implement parameter is computed by searching a point at which a function J of the mathematical formula 9 is minimized. Specifically, in the list of FIG. 8, the calibration values of the work implement parameters Nos. 1 to 29 are computed.

Among the work implement parameters included in the list of FIG. 8, the value input as bucket information is used as distance Lbucket4_x between bucket pin 15 and second link pin 48a in the xbucket axis direction and distance Lbucket4_z between bucket pin 15 and second link pin 48a in the zbucket axis direction.

Second calibration computing unit 65d calibrates the antenna parameters based on the antenna position information input to input unit 63. Specifically, second calibration computing unit 65d computes the coordinate of the midpoint between first measurement point P11 and second measurement point P12 as the coordinate of the position of reference antenna 21. Specifically, the coordinate of the position of reference antenna 21 is expressed by distance Lbbx between boom pin 13 and reference antenna 21 in the x-axis direction of the vehicular body coordinate system, distance Lbby between boom pin 13 and reference antenna 21 in the y-axis direction of the vehicular body coordinate system, and distance Lbbz between boom pin 13 and reference antenna 21 in the z-axis direction of the vehicular body coordinate system.

Second calibration computing unit 65d computes the coordinate of the midpoint between third measurement point P13 and fourth measurement point P14 as the coordinate of the position of directional antenna 22. Specifically, the coordinate of the position of directional antenna 22 is expressed by distance Lbdx between boom pin 13 and directional antenna 22 in the x-axis direction of the vehicular body coordinate system, distance Lbdy between boom pin 13 and directional antenna 22 in the y-axis direction of the vehicular body coordinate system, and distance Lbdz between boom pin 13 and directional antenna 22 in the z-axis direction of the vehicular body coordinate system. Then, second calibration computing unit 65d outputs the coordinates of the positions of antennas 21, 22 as the calibration values of antenna parameters Lbbx, Lbby, Lbbz, Lbdx, Lbdy, Lbdz.

The work implement parameters computed by first calibration computing unit 65c, the antenna parameters computed by second calibration computing unit 65d, and the bucket information are stored in storage 43 of display controller 39, and used to compute the position of cutting edge P.

An advantageous effect of the present embodiment will be described below.

In measuring jig 150 of the present embodiment and the calibration method using measuring jig 150, as illustrated in FIGS. 2 and 3, attachment member 103 is configured to be attached to the attached portion (for example, antenna support member 22a in FIG. 3) by sandwiching the attached portion. Measuring jig 150 can be attached to a portion extending upward from revolving unit 3 like antenna support member 22a. Consequently, prism mirror 101 of attachment member 103 can be observed by external measurement apparatus 62 even if the position of cutting edge P is located at any one of first to third slewing positions P21 to P23 as illustrated in FIG. 18 while hydraulic excavator 100 is small (for example, a minimal tail swing radius excavator or a minimal swing radius excavator). Thus, even in small hydraulic excavator 100, prism mirror 101 can be observed by external measurement apparatus 62 irrespective of the slewing angle position of revolving unit 3. This enables the calibration with high accuracy.

According to the present embodiment, as shown in FIGS. 2 and 3, measuring jig 150 includes magnet member 102 fixed to prism mirror 101. Thus, measuring jig 150 can be attached to revolving unit 3 by attracting magnet member 102 to a metallic portion (such as a counterweight) of revolving unit 3. This enables an increase of the number of options for the place where measuring jig 150 is attached. Consequently, for small hydraulic excavator 100, measuring jig 150 can be attached to the attached portion (such as antenna support member 22a) of hydraulic excavator 100 by attachment member 103. For medium or large hydraulic excavator 100, measuring jig 150 can be attached to the attached portion (such as the lower surface of the counterweight) of hydraulic excavator 100 by magnet member 102.

According to the present embodiment, as illustrated in FIGS. 2 and 3, second member 103b of measuring jig 150 is formed separately from first member 103a, and configured to be able to be fixed to first member 103a while the attached portion (such as antenna support member 22a) is sandwiched between first member 103a and second member 103b. This enables attachment member 103 of measuring jig 150 to be formed with a simple configuration.

According to the present embodiment, as illustrated in FIGS. 2 and 3, attachment member 103 includes elastic members 103ea, 103eb, 103fa, 103fb in the portion abutting on the attached portion (such as antenna support member 22a) while being attached to the attached portion. Thus, the attached portion is hardly scratched when attaching measuring jig 150 is attached to the attached portion of hydraulic excavator 100.

According to the present embodiment, illustrated in FIG. 3, elastic members 103ea, 103eb, 103fa, 103fb include elastic members 103ea, 103eb abutting on the rod-shape portion 22aa of the attached portion and elastic members 103fa, 103fb abutting on base portion 22ab. Thus, both rod-shape portion 22aa and base portion 22ab of the attached portion are hardly scratched when measuring jig 150 is attached to the attached portion of hydraulic excavator 100.

In the above embodiment, measuring jig 150 is attached to antenna support member 22a. Alternatively, measuring jig 150 may be attached so as to sandwich a handle of hydraulic excavator 100.

It should be considered that the disclosed embodiment is illustrative and non-restrictive in every respect. The scope of the present disclosure is defined by the terms of the claims rather than the description above, and intended to include any modifications within the scope and meaning equivalent to the terms of the claims.

REFERENCE SIGNS LIST

1: body, 2: work implement, 3: revolving unit, 3a: soil cover, 3b: sheet metal panel, 3c: engine hood, 4: operator's compartment, 5: traveling unit, 5a, 5b: crawler belt, 6: boom, 7: dipper stick, 8: bucket, 10: boom cylinder, 10a: boom cylinder foot pin, 101): boom cylinder top pin, 11: dipper stick cylinder, 11a: dipper stick cylinder foot pin, 11b: dipper stick cylinder top pin, 12: bucket cylinder, 12a: bucket cylinder foot pin, 12b: bucket cylinder top pin, 13: boom pin, 14: dipper stick pin, 15: bucket pin, 16: boom angle detector, 17: dipper stick angle detector, 18: bucket angle detector, 19: position detector, 21: reference antenna, 22: directional antenna, 22a: antenna support member, 22aa: rod-shape portion, 22ab: pedestal portion, 23: three-dimensional position sensor, 24: roll angle sensor, 25: operation apparatus, 26: work implement controller, 27: work implement control apparatus, 28: display system, 29: pitch angle sensor, 31: work implement operation member, 32: work implement operation detector, 33: travel control member, 34: travel control detector, 35, 43: storage, 36, 44, 65: computing unit, 37: hydraulic pump, 38: display input apparatus, 39: display controller, 41, 63: input unit, 42, 64: display unit, 44*a*: first current position computing unit, 44*b*: second current position computing unit, 45: design surface, 47: first link member, 47*a*: first link pin, 48: second link member, 48*a*: second link pin, 49: swing motor, 51: revolving control member, 52: revolving control detector, 53: guide screen, 60: calibration apparatus, 61, 75: icon, 62: external measurement apparatus, 65*a*: vehicular body coordinate system computing unit, 65*b*: coordinate transformation unit, 65*c*: first calibration computing unit, 65*d*: second calibration computing unit, 70: target surface, 73: confrontation compass, 73*a*: plan view, 73*b*: side view, 77: plane, 80: intersection line, 81: design surface line, 82: target surface line, 88: distance information, 100: hydraulic excavator, 101: prism mirror, 101*a*: prism body, 101*b*: exterior member, 101*ba*: glass surface, 102: magnet member, 103: attachment member, 103*a*: first member, 103*aa*, 103*ba*: through-hole, 103*ab*, 103*bb*: flange, 103*b*: second member, 103*c*: bolt, 103*d*: nut, 103*ea*, 103*eb*, 103*fa*, 103*fb*: elastic member, 104: fixed unit, 105: second turning unit, 106: first turning unit, 111, 112: rotation shaft, 150: measuring jig

The invention claimed is:

1. A measuring jig comprising:
  a prism mirror for reflecting projection light from an external measurement apparatus; and
  an attachment member for attaching the prism mirror to an attached portion of a revolving unit of a work vehicle, the revolving unit comprising an operator's compartment and an engine, the attachment member being configured to be attached to the attached portion by sandwiching the attached portion, wherein
  the measuring jig is configured to measure a slewing position of the revolving unit with respect to the external measurement apparatus.

2. The measuring jig according to claim 1, further comprising a magnet member fixed to the prism mirror.

3. The measuring jig according to claim 1,
  wherein the attachment member includes:
    a first member fixed to the prism mirror; and
    a second member formed separately from the first member, the second member being configured to be able to be fixed to the first member while the attached portion is sandwiched between the first member and the second member.

4. The measuring jig according to claim 1, wherein the attachment member includes an elastic member at a portion abutting on the attached portion while the attachment member is attached to the attached portion.

5. The measuring jig according to claim 4,
  wherein
    the attached portion includes a rod-shape portion extending into a rod shape and a base portion protruding from the rod-shape portion to an outer circumferential side, and
    the elastic member includes a first elastic member abutting on the rod-shape portion and a second elastic member abutting on the base portion.

6. A hydraulic excavator calibration method for calibrating a plurality of parameters in a hydraulic excavator, the hydraulic excavator including:
  a revolving unit including an operator's compartment, an engine, an antenna and a support for supporting the antenna;
  a work implement including a boom attached to the revolving unit, a dipper stick attached to a tip of the boom, and a work tool attached to a tip of the dipper stick; and
  a controller for computing a current position of a work point included in the work tool based on the plurality of parameters including a slewing position of the revolving unit,
  the hydraulic excavator calibration method comprising the steps of:
    attaching a measuring jig including a prism mirror and an attachment member fixed to the prism mirror, to the support;
    projecting projection light from an external measurement apparatus to the prism mirror and measuring reflected light reflected from the prism mirror to measure the Stewing position of the revolving unit; and
    calibrating the plurality of parameters based on the measured slewing position.

7. The hydraulic excavator calibration method according to claim 6, comprising:
  projecting projection light from an external measurement apparatus to the prism mirror and measuring reflected light reflected from the prism mirror to measure a plurality of stewing positions of the revolving unit; and
  calibrating the plurality of parameters based on the plurality of measured stewing positions.

* * * * *